(12) United States Patent
Oka et al.

(10) Patent No.: US 6,568,768 B1
(45) Date of Patent: May 27, 2003

(54) BRAKE SYSTEM

(75) Inventors: Hiroyuki Oka, Higashimatsuyama (JP); Michio Kobayashi, Higashimatsuyama (JP); Masahiro Shimada, Higashimatsuyama (JP); Hidefumi Inoue, Higashimatsuyama (JP); Yoshiyasu Takasaki, Higashimatsuyama (JP); Masahiro Ikeda, Higashimatsuyama (JP); Makoto Watanabe, Higashimatsuyama (JP); Mamoru Sawada, Kariya (JP); Yuzo Imoto, Kariya (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/219,766

(22) Filed: Dec. 23, 1998

(30) Foreign Application Priority Data

| Dec. 24, 1997 | (JP) | 9-354924 |
| Jan. 8, 1998 | (JP) | 10-002437 |
| Jan. 12, 1998 | (JP) | 10-016345 |
| Mar. 18, 1998 | (JP) | 10-068165 |
| Oct. 13, 1998 | (JP) | 10-290496 |
| Oct. 13, 1998 | (JP) | 10-290503 |
| Oct. 30, 1998 | (JP) | 10-325860 |

(51) Int. Cl.$^7$ ............................................. B60T 8/34
(52) U.S. Cl. ........................ 303/113.3; 303/114.3; 91/376 R
(58) Field of Search ........................ 303/113.3, 114.1, 303/114.2, 114.3, 115.1, 115.3, 4, 12; 91/376 R; 60/552

(56) References Cited

U.S. PATENT DOCUMENTS

| 3,771,316 A | * 11/1973 | Nordeen | 60/550 |
| 4,665,701 A | * 5/1987 | Bach | 60/547.1 |
| 5,350,224 A | * 9/1994 | Nell et al. | 303/113.3 |
| 5,454,279 A | * 10/1995 | Castel et al. | 74/550.5 |
| 5,746,057 A | * 5/1998 | Shim | 60/545 |
| 5,771,773 A | * 6/1998 | Sakamoto et al. | 91/369.2 |
| 5,802,952 A | * 9/1998 | Ikeda | 91/369.1 |
| 5,816,667 A | * 10/1998 | Jokic | 303/113.4 |
| 6,003,426 A | * 12/1999 | Kobayashi et al. | 91/376 R |

* cited by examiner

Primary Examiner—Christopher P. Schwartz
Assistant Examiner—Xuan Lan Nguyen
(74) Attorney, Agent, or Firm—Kanesaka & Takeuchi

(57) ABSTRACT

A brake system 1 of the present invention comprises a brake operating means 2 such as a brake pedal for carrying braking operation, a fluid variable stroke means 3 which variably controls the stroke of the brake operating means 2 by using fluid, and a braking force output means 4 which is actuated by the operation of the brake operating means 2 to produce braking forces. By manipulating the brake operating means 2, the braking force output means 4 performs the braking operation. The traveling rang of the brake operating means 2 i.e. the stroke can be changed variously by the fluid variable stroke means 3 using fluid. Since the stroke of the brake pedal can be changed as mentioned above, a proper pedal stroke can be obtained.

6 Claims, 25 Drawing Sheets

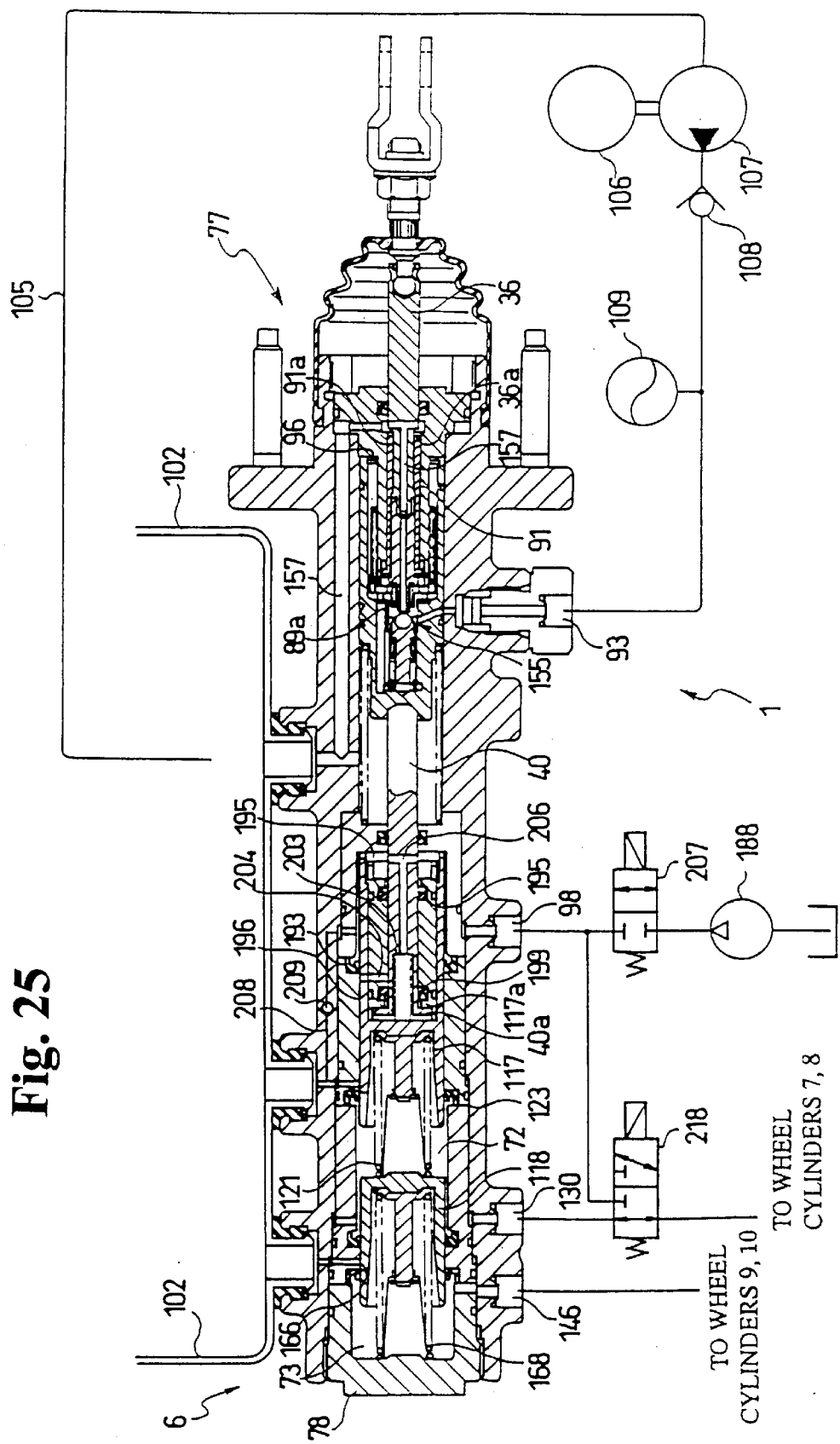

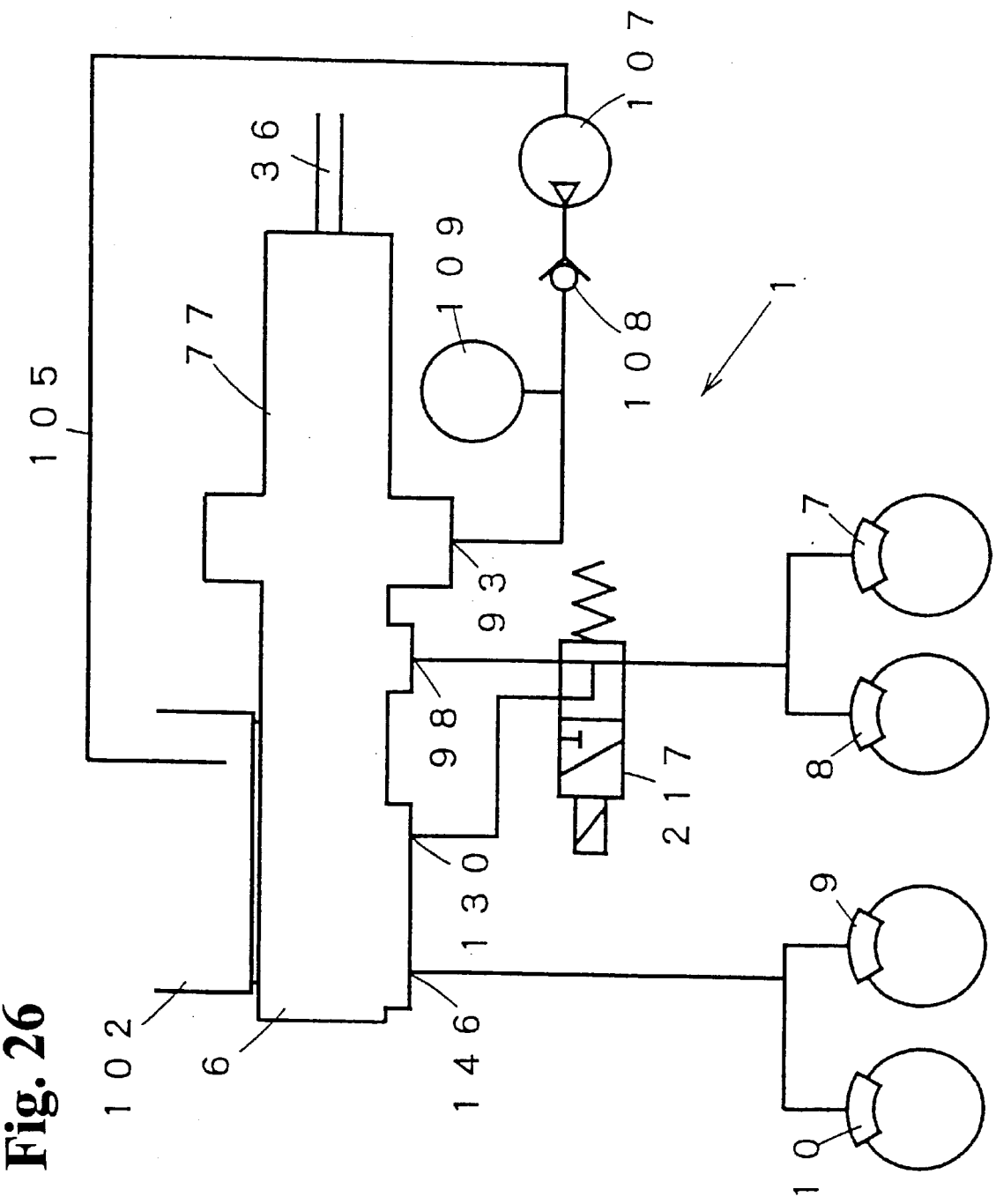

BRAKE SYSTEM

BACKGROUND OF THE INVENTION

The present invention relates to a brake system in which stroke of a brake operating means such as a brake pedal can be changed relative to the same braking effort.

In a brake system of an automobile, a master cylinder is actuated by pedaling a brake pedal so as to develop master cylinder pressure which is then supplied to wheel cylinders. The wheel cylinders thus develop braking forces, thereby braking the automobile. The brake system of this type is well known. In this case, the brake system employs a boosting device, which is operated by fluid pressure such as vacuum pressure, hydraulic pressure, or compressed air pressure, interposed between the brake pedal and the master cylinder. The boosting device is actuated by pedaling the brake pedal to boost leg-power exerted on the brake pedal to output boosted power for actuating the master cylinder, thereby providing large braking force with small leg-power on the brake pedal.

In such a brake system, the same pedal stroke results always the same braking force. That is, the braking force is determined relative to the pedal stroke without other choice.

However, as the same pedal stroke results always the same braking force, it can not keep up with the improvement of its responsiveness such as its operational feeling.

Therefore, a boosting device has been proposed in Japanese Patent Publication Showa 57-4547, which can keep up with the improvement of its responsiveness by changing the relation between the pedal stroke and the braking force. In the boosting device disclosed in this publication, a power piston is brought in contact with one side of one end of a power lever, an input rod is brought in contact with one side of the other end of the power lever, and an output rod is brought in contact with the other side of an intermediate portion of the power lever. In this manner, the displacement of the input rod becomes a value which is the displacement of the output rod subtracted by the displacement of the other end of the power lever by the rotation of the power lever, thereby obtaining larger displacement of the output rod even with a small displacement of the input rod. That is, the boosting device of the publication is designed to change the displacement of the output rod, i.e. the braking force, at a constant ratio relative to the displacement of the input rod.

However, since the aforementioned boosting device is designed to change the displacement of the output rod at a constant ratio relative to the displacement of the input rod, the displacement of the output rod can not be changed to any different value relative to the displacement of the input rod as long as using the boosting device. Further, since the displacement of the output rod is always changed relative to the displacement of the input rod in the aforementioned boosting device, the displacement of the output rod is changed even when the user wishes not to change the displacement of the output rod relative to the displacement of the input rod.

As mentioned above, as the displacement of the output rod is changed always and at a constant ratio relative to the displacement of the input rod, it is difficult to obtain good operational feeling and also difficult to set proper pedal stroke corresponding to vehicle condition such as load, brake operating condition, and/or a driver.

SUMMARY OF THE INVENTION

It is an object of the present invention to provide a brake system which allows the traveling range of a brake operating means to be controlled freely.

In order to achieve this object, a brake system of the present invention is a brake system in which a braking force output means produces braking forces corresponding to the braking operation of a brake operating means, and is characterized in that the traveling range of the brake operating means can be changed by fluid control.

Further, a brake system of the present invention comprises: a brake operating means; a brake pressure output means for producing brake fluid pressure according to the operation of the brake operating means; and a braking force output means for producing braking forces according to the brake pressure, and is characterized by further comprising a traveling range control means for allowing the traveling range of the brake operating means to be changed by fluid control, wherein the traveling range of the brake operating means is changed by the traveling range control means.

The present invention is characterized in that the brake pressure output means has a pressure boosting device, and the traveling range control means is provided in the pressure boosting device.

Further, the present invention is characterized in that the traveling range control means controls the relative displacement of an output member of the pressure boosting device relative to an input member of the pressure boosting device by using fluid to change the traveling range of the brake operating means.

Furthermore, the present invention is characterized in that the traveling range control means controls the reaction of a reaction mechanism of the pressure boosting device by using fluid to control the displacement of the output member relative to the input member.

Moreover, the present invention is characterized in that the traveling range control means controls the displacement of a control valve means of the brake boosting device relative to the output means by using fluid to control the displacement of the output member relative to the input member.

In addition, the present invention is characterized in that the brake pressure output means comprises a pressure boosting device and a master cylinder actuated by the pressure boosting device, and the traveling range control means is provided between the pressure boosting device and the master cylinder.

Further, the present invention is characterized in that the traveling range control means controls the displacement of a piston of the master cylinder relative to an output member of the pressure boosting device by using fluid to change the traveling range of the brake operating means.

Furthermore, the present invention is characterized in that the brake pressure output means has a master cylinder and the traveling range control means is provided in the master cylinder.

Moreover, the present invention is characterized in that the traveling range control means is provided between the brake pressure output means and the braking force output means.

In addition, the present invention is characterized by further comprising a fluid pressure source for producing fluid pressure, wherein the traveling range control means has a solenoid switching valve which selectively switches to supply either one of the fluid pressure from the brake pressure output means or the fluid pressure from the fluid pressure source to the braking force output means.

Further, the present invention is characterized in that the change of the traveling range of the brake operating means is conducted whenever predetermined condition is satisfied.

Furthermore, the present invention is characterized in that the predetermined condition is set based on at least one of conditions such as vehicle load condition, brake operating condition, road surface condition, and choice by a driver.

In the brake system of the present invention as structured above, the stroke of the brake operating means can be variously changed by using fluid at any time or whenever necessary. Since the stroke of the brake operating means can be changed by using fluid, the stroke can be variously set in a simple manner of controlling the fluid by the electronic control unit.

Therefore, the brake operating means can be set variously to have a proper pedal stroke corresponding to vehicle condition such as load, brake operating condition, and/or choice by a driver.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 25 is a view showing a fifteenth embodiment of the present invention, and FIG. 26 is a view showing a sixteenth embodiment of the present invention.

DESCRIPTION OF THE PREFERRED EMBODIMENTS

Figure 1:
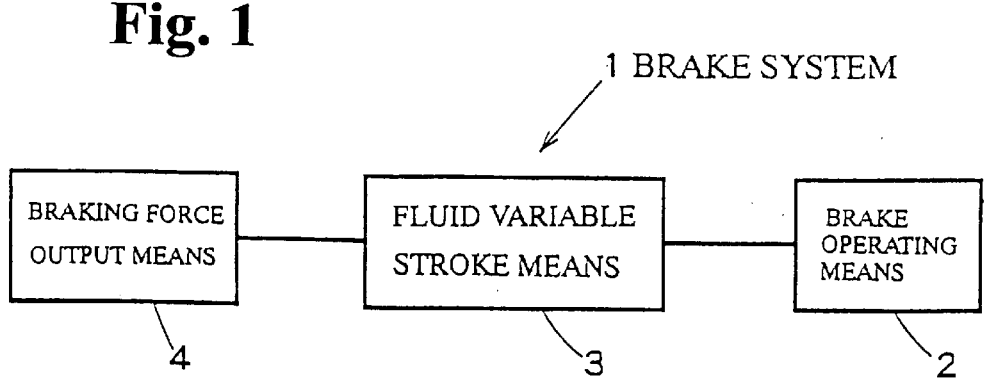
FIG. 1 is an illustration for explaining the radical principle of a brake system in accordance with the present invention.

FIG. 1 is an illustration for explaining the radical principle of a brake system in accordance with the present invention.

As shown in FIG. 1, the brake system 1 according to the present invention basically comprises a brake operating means 2 such as a brake pedal for carrying braking operation, a fluid variable stroke means 3 which variably controls the stroke of the brake operating means 2 by using fluid, and a braking force output means 4 which is actuated by the operation of the brake operating means 2 to produce braking force. The fluid variable stroke means 3 corresponds to a traveling range control means of the present invention. As the brake operating means 2 is operated, the braking force output means 4 performs the braking operation. At this point, the fluid variable stroke means 3 can change the manipulated-distance, i.e. the stroke, to different values by the fluid relative to the same output of the braking force output means 4 at any time or whenever necessary.

Figure 2:
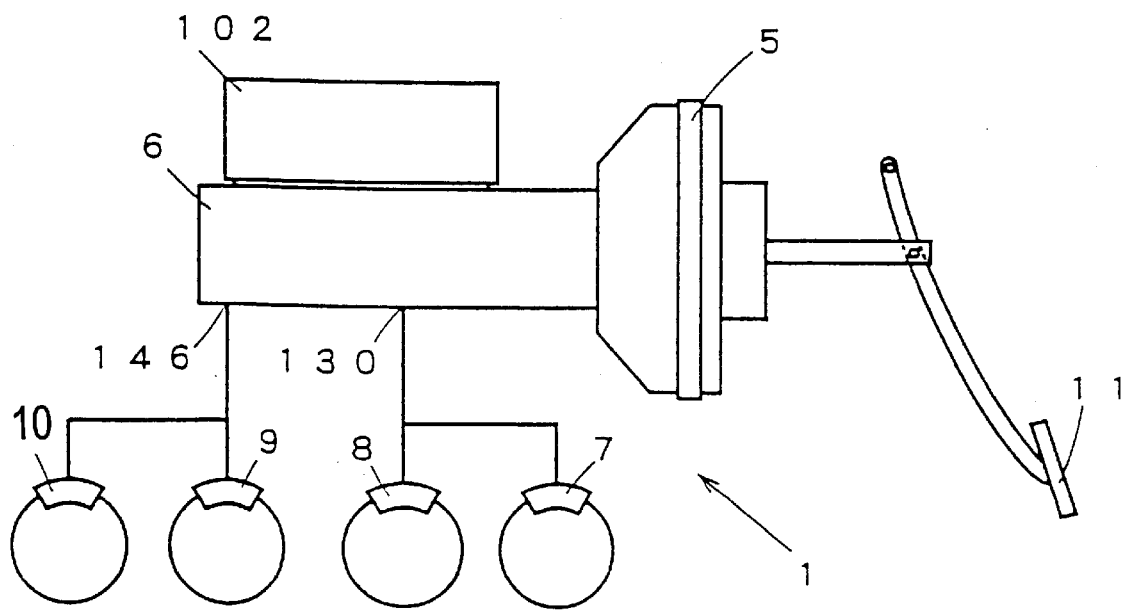
FIG. 2 is a view of a first embodiment of the brake system in accordance with the present invention.
Figure 3:
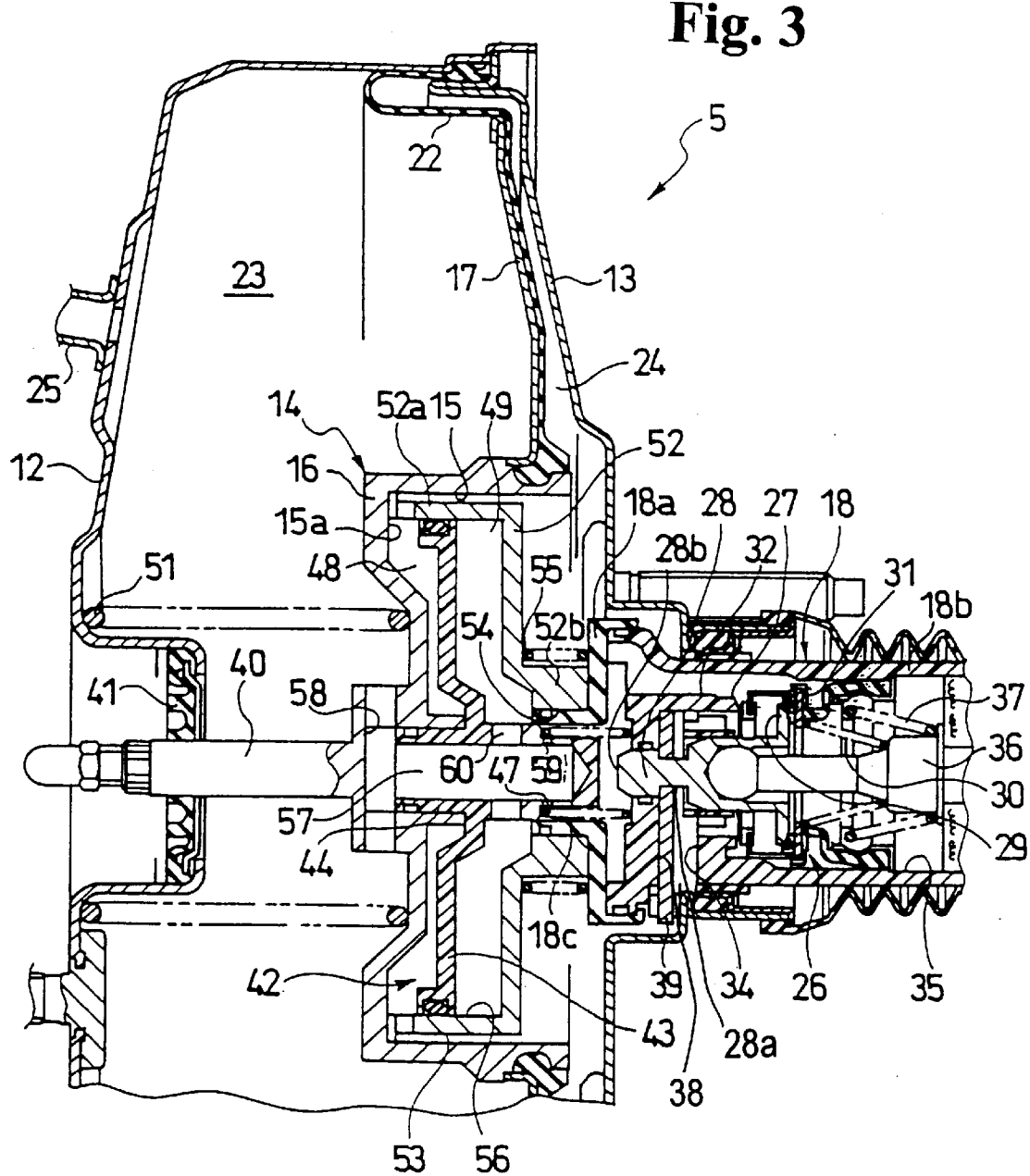
FIG. 3 is a sectional view partly showing a first embodiment of the present invention.

FIG. 2 is a view showing the first embodiment of the brake system of the present invention, and FIG. 3 is a sectional view partially showing a vacuum boosting device employed in the brake system shown in FIG. 2. It should be noted that parts similar or corresponding to the parts shown in FIG. 1 will be marked by the same reference numerals so that the description about the parts will be omitted (the same is true for the description of the following other embodiments, so parts similar or corresponding to the parts of preceding embodiments will be marked by the same reference numerals).

As shown in FIG. 2, the brake system 1 of the first embodiment comprises the vacuum boosting device 5, a master cylinder 6 of tandem type which is actuated by the vacuum boosting device 5 to produce master cylinder pressure, wheel cylinders 7, 8, 9, and 10 into which the master cylinder pressure is supplied so as to produce braking forces, and a brake pedal 11 for operating the vacuum boosting device 5. The wheel cylinders 7, 8, 9, and 10 correspond to the braking force output means 4 of FIG. 1 and the brake pedal 11 correspond to the brake operating means 2.

As shown in FIG. 3, the vacuum boosting device 5 has a power piston 14, which is disposed in a sealed container comprising a front shell 12 and a rear shell 13 in the same manner as the conventional vacuum boosting device. The power piston 14 comprises a cylinder portion 16 having a stepped cylinder hole 15, which has a bottom and opens toward the rear side, and a disc plate-like piston portion 17 fixed to the cylinder portion 16. Disposed in the stepped cylinder hole 15 of the cylinder 16 is a front portion of a valve body 18.

The sealed container composed of the front shell 12 and the rear shell 13 is divided into a constant-pressure chamber 23 at the front side and a variable-pressure chamber 24 at the rear side by a diaphragm piston 22 disposed on the back of the piston portion 17 of the power piston 14. The constant-pressure chamber 23 communicates with an intake manifold of an engine (not shown) through a vacuum introducing pipe 25 so that negative pressure is always introduced in the constant-pressure chamber. The variable-pressure chamber 24 communicates with the constant-pressure chamber 23 so that negative pressure is introduced in the variable-pressure chamber in its inoperative state, and communicates with the atmosphere so that atmospheric pressure is introduced in the variable-pressure chamber in its operative state.

The cylinder hole 15 of the cylinder portion 16 is a regular hole extending the entire length with one diameter. Loosely inserted in the cylinder hole 15 is a cylinder member 52 and the cylinder member 52 is fixed therein. The cylinder member 52 is formed in a stepped cylindrical configuration having a large-diameter portion 52a at the front side and a small-diameter portion 52b at the rear side. The large-diameter portion 52a of the cylinder member 52 is inserted from the rear side into the cylinder hole 15, the front end of the large-diameter portion 52a is brought in contact with the bottom 15a of the cylinder hole 15, and the cylinder portion 16 and the cylinder member 52 are integrally connected to each other. In the state where the cylinder portion 16 and the cylinder member 52 are connected, an annular second variable-pressure passage 53 is formed between the inner surface of the cylinder hole 15 and the outer surface of the large-diameter portion 52a. The second variable-pressure passage 53 is set to have a relatively small flowing area.

The valve body 18 comprises a front member 18a and a rear member 18b which are integrally connected to each other. The front member 18a has a small front end portion 18c which is sealingly and slidably inserted in an axial hole 54 of the small-diameter portion 52b of the cylinder member 52. Compressed and disposed between the cylinder member 52 and the valve body 18 is a spring 55 which always biases the cylinder member 52 and the valve body 18 in a direction separating from each other.

Disposed in the valve body 18 is a control valve 26, which comprises a first valve seat 27 formed inside the valve body 18, a second valve seat 29 formed at the rear end of a valve plunger 28 slidably disposed in the valve body 18, and a valve member 31 which is disposed in the valve body 18 and is biased by a poppet return spring 30 so as to sit in or move apart from the first and second valve seats 27, 29.

A portion outside the first valve seat 27 always communicates with a constant-pressure passage 32 axially formed in the valve body 18. The axial hole 57 always communicates with the constant-pressure chamber 23 through a radial hole 58 formed in the cylinder portion 16 and always communicates with the constant-pressure passage 32 through a radial hole 59 formed in the piston rod 44. The space between the first and second valve seats 27, 29 always communicates with the variable-pressure chamber 24 through a variable-pressure passage 34 radially formed in the valve body 18. Further, the inside of the second valve seat 29 always communicates with the atmosphere through a pressure passage 35 formed in the valve body 18. Then, the first valve seat 27 and the valve member 31 compose a vacuum valve which allows the variable-pressure chamber 24 to communicate with the constant-pressure chamber 23 to supply negative pressure into the variable-pressure chamber 24. The second valve seat 29 and the valve member 31 compose an atmosphere valve which allows the variable-pressure chamber 24 to communicate with the atmosphere to supply atmospheric pressure into the variable-pressure chamber 24.

An input shaft 36 is pivotally connected to a right-end portion of the valve plunger 28 at the front end thereof and is connected to the brake pedal 11 at the rear end thereof. Interposed and compressed between the input shaft 36 and the valve body 18 is a valve return spring 37 having greater spring force than that of the poppet return spring 30. Therefore, the valve member 31 sits in the second valve seat 29 of the valve plunger 28 and is spaced apart from the first valve seat 27 in its inoperative state.

A key insertion hole 38 is radially formed in the valve body 18 and a key member 39 is inserted in the key insertion hole 38. The key member 39 has two forked ends which are engaged with a small-diameter portion 28a of the valve plunger 28. The key member 39 prevents the valve plunger 28 from coming off the valve body 18. In this case, the variable-pressure passage 34 and the key insertion hole 38 are adjacent to each other in the axial direction so that they are integrally formed.

The key member 39 is movable in an axial range of the key insertion hole 38 and also movable in an axial range of the small-diameter portion 28a of the valve plunger 28. When the vacuum boosting device 5 is in the inoperative state as shown in FIG. 3, the key member 39 comes in contact with an inner wall of the rear shell 13 and the valve plunger 28 is held in a position advanced relative to the valve body 18 so that play in stroke of the input shaft 36 is reduced at the initial stage of the operation of the vacuum boosting device 5.

Connected to the bottom of the cylinder portion 16 of the power piston 14 is the rear end of an output shaft 40. The output shaft 40 slidably penetrates the front shell 12, is sealed by a sealing member 41, and projects forward outside the sealed container. The front end of the output shaft 40 is in contact with the primary piston (not shown) of the master cylinder 6 so that the output shaft 40 actuates the primary piston when the power piston 14 works. While the vacuum boosting device 5 and the master cylinder 6 work, reaction from the master cylinder 6 is transmitted to the power piston 14 through the output shaft 40. The reaction transmitted to the power piston 14 is not transmitted to the valve body 18 because the small front end portion 18c of the valve body 18 is slidably fitted in the stepped cylinder hole 15 of the cylinder portion 16. Since the power piston 14 and the valve plunger 28 are not in contact with each other neither directly nor indirectly, the reaction is not transmitted to the input shaft 36 through the valve plunger 28.

Since, however, the reaction is not transmitted to the input shaft 36 during the braking operation, the driver can not obtain the feeling of the braking operation. To eliminate this shortcoming, the brake system 1 of the first embodiment has a reaction providing means 42 in the vacuum boosting device 5. The reaction providing means 42 comprises a reaction piston 43 which is positioned in front of the valve body 18. The reaction piston 43 is sealingly and slidably fitted in an axial hole 56 formed in the large-diameter portion 52a of the cylinder member 52. Further, a front portion of the piston rod 44 of the reaction piston 43 is sealingly and slidably inserted in a central hole formed in the cylinder portion 16 and a rear portion of the piston rod 44 is sealingly and slidably inserted in an axial hole formed in the small front end portion 18c of the front member 18a of the valve body 18. The rear portion of the piston rod 44 confronts the front end of the valve plunger 28 and is capable of being in contact with the front end of the valve plunger 28. The piston rod 44 is formed in a cylindrical configuration with a bottom and having an axial hole 57 opening toward the front side.

The second variable-pressure chamber 48 at the front side of the reaction piston 43 always communicates with the variable-pressure chamber 24 through the second variable-pressure passage 53 and the second constant-pressure chamber 49 at the rear side of the reaction piston 43 always communicates with the axial hole 57 i.e. the constant-pressure chamber 23 through the radial hole 60 of the piston rod 44.

The front end of the valve plunger 28 and the rear end of the piston rod 44 confront to each other. In this case, when the brake system is inoperative as shown in FIG. 3, a predetermined space exists between the front end of the valve plunger 28 and the rear end of the piston rod 44. On the other hand, when the brake system is operative, the valve body 18 advances so that the key member 39 becomes apart from the inner wall of the rear shell 13 i.e. the key member 39 retreats relative to the valve body 18 and the reaction piston 43 also retreats relative to the valve body 18, whereby the rear end of the piston rod of the reaction piston 43 and the front end 28b of the valve plunger 28 are brought in contact with each other. The contact between the reaction piston 43 and the valve plunger 28 allows the reaction from the reaction piston 43 to be transmitted to the brake pedal 11 through the valve plunger 28 and the input shaft 36.

Moreover, the reaction piston 43 is always biased toward the front side by a spring 47 disposed between the reaction piston 43 and the valve body 18.

In the cylinder hole of the cylinder member 42, a second variable-pressure chamber 48 is defined between the bottom of the cylinder portion 16 and the reaction piston 43 and a second constant-pressure chamber 49 is defined between the cylinder member 52 and the reaction piston 43.

The cylinder portion 16 of the power piston 14 is always biased rearwardly by a return spring 51.

The master cylinder 6 of tandem type is well known in the art conventionally and comprises a primary piston and a secondary piston (not shown). The primary piston is actuated by the output of the vacuum boosting device 5 to develop master cylinder pressure and the secondary piston is actuated by the master cylinder pressure to develop master cylinder pressure which is then supplied to the corresponding wheel cylinders 7, 8, 9, 10.

The description will now be made as regard to the operation of the brake system 1 of the first embodiment as structured above.

When the brake system is inoperative, the vacuum boosting device 5 is in the inoperative state as shown in FIG. 3, where the vacuum valve is opened and the atmosphere valve is closed so that negative pressure is supplied to the variable-pressure chamber 24 and the second variable-pressure chamber 48 and there is no pressure difference between the variable-pressure chamber 24 and the constant-pressure chamber 23 and between the second variable-pressure chamber 48 and the second constant-pressure chamber 49. Therefore, the power piston 14 and the reaction piston 43 do not operate so that the vacuum boosting device 5 develops no output.

As the brake pedal 11 is pedaled at this state to perform the normal braking operation, the input shaft 36 advances.

Then, the valve body 31 sit in the first valve seat 27 and becomes apart form the second valve seat 29 so that the vacuum valve is closed and the atmosphere valve is opened. Accordingly, the variable-pressure chamber 24 is shut off from the constant-pressure chamber 23 and is connected to the atmosphere whereby the atmospheric pressure is supplied to the variable-pressure chamber 24 and the power piston 14 is actuated to advance. That is, the power piston 14 boosts the leg power exerted on the brake pedal to output. The output of the power piston 14 actuates the primary piston of the master cylinder 6 through the output shaft 40 so that the primary piston develops master cylinder pressure and the secondary piston thus develops master cylinder pressure. These master cylinder pressure is supplied to the wheel cylinders 7, 8, 9, and 10, thereby obtaining braking action. At this point, the master cylinder pressure is transmitted to the power piston 14 through the output shaft 40 but not transmitted to the valve plunger 28.

On the other hand, the atmospheric pressure is supplied to the variable-pressure chamber 24 and also supplied to the second variable-pressure chamber 48 through the variable-pressure passage 34 and the variable-pressure passage 53. Then, a pressure difference is produced between both sides of the reaction piston 43 so that the reaction piston 43 is biased toward the rear. In addition, a pressure difference is produced between both sides of the front member 18a of the valve body 18. Because of the pressure difference, the valve body 18 also advances. By the advance of the valve body 18, the key member 39 advances and apart from the inner wall of the rear shell 13. After that, the key member 39 and the reaction piston 43 retreats so that the rear end of the piston rod 44 and the front end of the valve plunger 28 come in contact with each other. Therefore, the reaction produced by pressure differences between both sides of the reaction piston 43 is transmitted to the brake pedal 11 through the valve plunger 28 and the input shaft 36.

As the pressure in the variable-pressure chamber 24 reaches a predetermined value corresponding to the input, the vacuum boosting device 5 is in a servo-balanced state in the middle load region. That is, in the power piston 14 in this state, the rearward force by the brake reaction from the output shaft 40 and the spring force of the return spring 51 and the forward force by the pressure difference between the variable-pressure chamber 24 and the constant-pressure chamber 23 are balanced.

Further, in the reaction piston 43 in this state, the rearward force and the pressure difference between the second variable-pressure chamber 48 and the second constant-pressure chamber 49 and the forward force by the spring force of the spring 47 and the leg power of the driver exerted on the brake pedal 11, i.e. the forward force of the valve plunger 28, are balanced. In this case, by changing the pressure difference between the second variable-pressure chamber 48 and the second constant-pressure chamber 49 relative to the leg power on the brake pedal 11, the spring force of the spring 47 is changed. However, in the middle load state, since the atmosphere valve and the vacuum valve are both closed, the relative positions of the valve body 18 and the reaction piston 43 are determined without other choice so that the spring force of the spring 47 must be determined by the relative positions of the power piston 14 and the valve body 18.

Therefore, by changing the pressure of the second variable-pressure chamber 48, the position of the valve body 18 i.e. the input shaft 36 relative to the power piston 14. That is, by changing the pressure in the second variable-pressure chamber 48, the distance of advance of the valve body 18 i.e.

the input shaft 36 can be set smaller than that of the power piston 14. The spring force of the spring 47, the pressure receiving area, and the reaction piston 43 can be set separately. In the first embodiment, the pressure in the variable-pressure chamber 24 is introduced into the second variable-pressure chamber 48 and the advance of the valve body 18 is set to be smaller than that of the power piston 14 due to the pressure in the variable-pressure chamber 24.

The output shaft 40 receiving the brake reaction is required to relatively largely move to compensate play in strokes of the piston of the master cylinder 6 and the wheel cylinders 7, 8, 9, 10, i.e. from when the piston of the master cylinder 6 starts to advance to when the brake pressure is substantially increased. On the other hand, the distance of advance of the valve body 18 is determined by the spring force of the spring 55 and the pressure receiving area of the front member 18a independently of the magnitude of the brake reaction. In the first embodiment, the distance of advance of the valve body 18 is set to be smaller than that of the power piston 14 as mentioned above. Therefore, the stroke of the input shaft 36, which advances with the advance of the valve body 18, and the stroke of the brake pedal 11, which interacts with the input shaft 36, become relatively smaller. The larger the leg power on the brake pedal 11, the smaller is the stroke of the brake pedal 11 relative to the stroke of the power piston 14.

In the reaction piston 43, as mentioned above, since the rearward force by the pressure difference between the second variable-pressure chamber 48 and the second constant-pressure chamber 49 and the forward force by the spring force of the spring 47 and the leg power of the driver exerted on the brake pedal 11 i.e. the valve plunger 28 are balanced, transmitted as reaction to the brake pedal 11 is a rearward force by the spring force of the spring 47 and the pressure difference between the second variable-pressure chamber 48 and the second constant-pressure chamber 49. In this case, the pressure difference between the second variable-pressure chamber 48 and the second constant-pressure chamber 49 is equal to the pressure difference between the variable-pressure chamber 24 and the constant-pressure chamber 23. In addition, the pressure difference between the variable-pressure chamber 24 and the constant-pressure chamber 23 corresponds to the leg power exerted on the brake pedal 11. As a result of this, the reaction corresponds to the leg power exerted on the brake pedal 11.

In the brake system 1 of the first embodiment, the fluid variable stroke means 3 allows the relative movement between the power piston 14 and the valve body 18, i.e. between the output shaft 40 and the input shaft 36, and applies the reaction to the control valve 26 by fluid pressure. That is, the fluid variable stroke means 3 allows the separation between the power piston 14 and the valve body 18 so that they can move relative to each other and changes the reaction of the reaction mechanism by using the atmospheric pressure so as to change the stroke of the brake pedal by the atmospheric pressure whenever the vacuum boosting device 5 is actuated. In this case, the atmospheric pressure for controlling the reaction of the reaction mechanism is changed by the leg power exerted on the brake pedal so that the larger the leg power, the smaller is the stroke of the brake pedal. Therefore, according to the first embodiment, the stroke of the brake pedal can be changed at a different ratio corresponding to the leg power on the brake pedal.

In the vacuum boosting device 5 of the first embodiment, the second variable-pressure chamber 48 is shut off from the variable-pressure chamber 24 and the pressure in the second variable-pressure chamber 48 is controlled by a solenoid valve but not shown, whereby the stroke of the brake pedal 11 can be changed variously and therefore can be properly set corresponding to vehicle condition such as load, brake operating condition, road surface condition, and/or a driver. By manipulating the stroke control button, the driver can set the pedal stroke according to the driver's preference.

Figure 4:
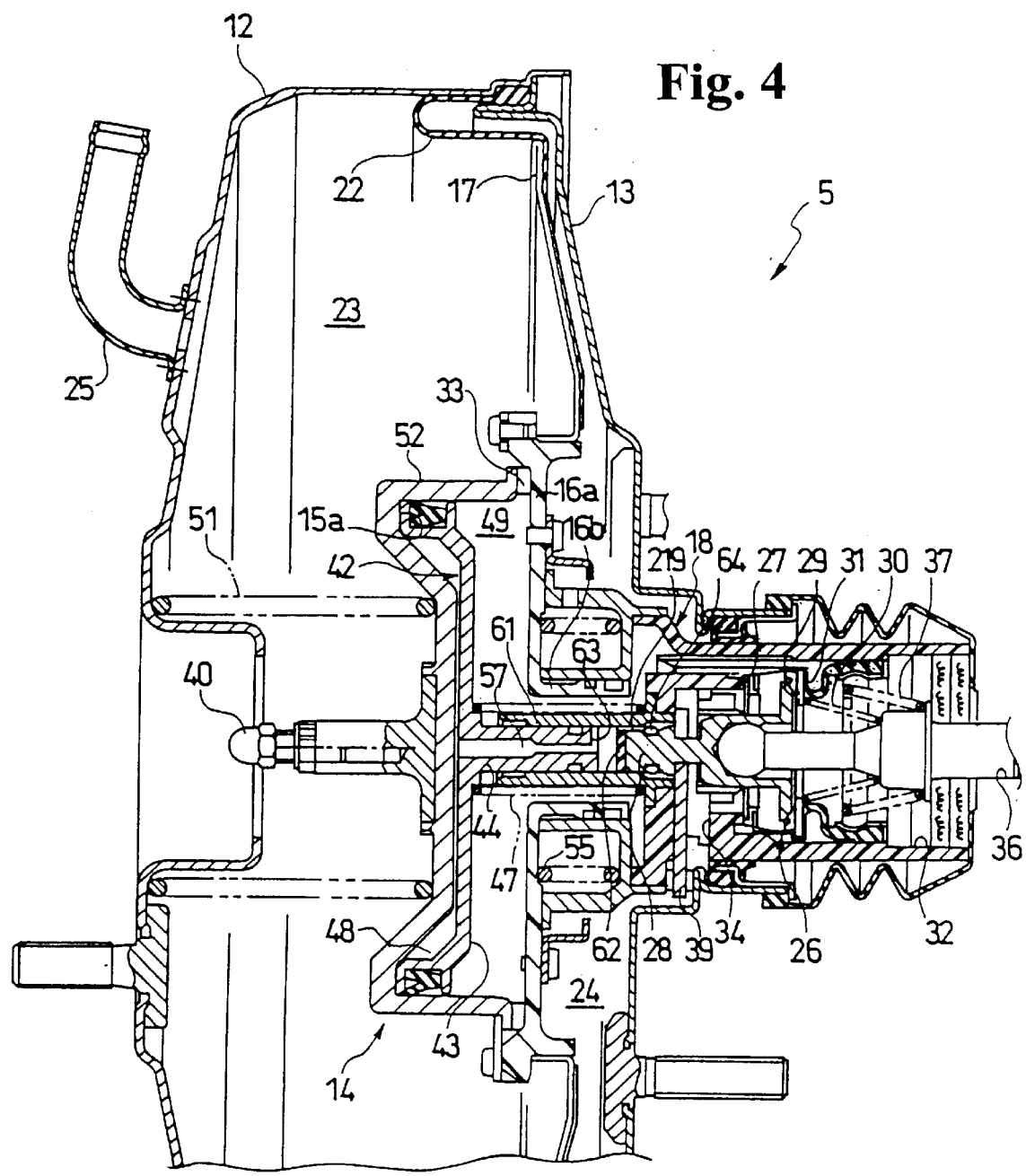
FIG. 4 is a sectional view partly showing a second embodiment of the present invention in its operative state.

FIG. 4 is a sectional view partially showing the second embodiment of the present invention in its operative state.

The brake system 1 of the second embodiment has a reaction providing means 42 different from that of the 1st embodiment mentioned above. In the reaction providing means 42 of the 2nd embodiment as shown in FIG. 4, the cylinder portion 16 comprises a plate-like portion 16a to which the piston portion 17 of the power piston 14 and the diaphragm piston 22 are connected, a central small-cylindrical portion 16b sealingly and slidably inserted into the axial hole formed in the small front end portion 18c of the front member 18a of the valve body 18, and a cylinder member 52 connected to the plate-like portion 16a. The cylinder member 52 is formed in a cylindrical configuration with a bottom and opening toward the rear side.

A sleeve 61 is connected to the front end of the valve plunger 28 and is loosely inserted in the small cylindrical portion 16b of the cylinder portion 16. The piston rod 44 and the front end of the valve plunger 28 are sealingly and slidably fitted in the sleeve 61, respectively. Fixed to the front end of the valve plunger 28 is a rubber damper 62 disposed to confront and be apart from the rear end of the piston rod 44 when the vacuum boosting device 5 is inoperative. Until the vacuum boosting device 5 becomes in the full load state after the termination point of the boosting action, the second variable-pressure chamber 48 communicates with the variable-pressure chamber 24 through the axial hole 57 and a radial groove 63 of the piston rod 44, a space passage 219 between the outer surface of the front end of the valve plunger 28 and the inner surface of the sleeve 61, and the variable-pressure passage 34. In the full load state of the vacuum boosting device after the termination point of the boosting action, the valve plunger 28 advances relative to the sleeve 61 for a predetermined distance so that a seal member 64 disposed on the valve plunger 28 shuts off the space passage 219 between the outer surface of the front end of the valve plunger 28 and the inner surface of the sleeve 61, thereby shutting off the second variable-pressure chamber 48 from the variable-pressure chamber 24 and sealing the second variable-pressure chamber 48.

The other structure of the brake system 1 of the second embodiment is the same as that of the first embodiment.

In the brake system 1 of the second embodiment as structured above, during the normal braking, in the same manner as that of the first embodiment, the rear end of the piston rod 44 of the reaction piston 43 comes in contact with the damper 62 at the front end of the valve plunger 28 by a pressure difference between the second variable-pressure chamber 48 and the second constant-pressure chamber 49. Impact by this contact is absorbed by the damper 62.

As the pressure in the variable-pressure chamber 24 reaches the maximum pressure which is determined by the atmospheric pressure, the vacuum boosting device 5 terminates the boosting action and becomes in the full load state. In the full load state of the vacuum boosting device 5, the seal member 64 of the valve plunger 28 shuts off the second variable-pressure chamber 48 from the variable-pressure chamber 24 so that the second variable-pressure chamber 48 is in the sealed state. As the input shaft 36 further advances at this state, the reaction piston 43 advances through the valve plunger 28 so as to compress air in the second variable-pressure chamber 48. As a result of this, the pressure in the second variable-pressure chamber 48 is increased. According to the increase in the pressure of the second variable-pressure chamber 48, the power piston 14 i.e. the output shaft 40 moves for a larger stroke than that of the input shaft 36. That is, the displacement of the input shaft 36 becomes smaller as compared with the displacement of the output shaft 40, thereby shortening the pedal stroke.

The action and effects of the second embodiment are substantially the same as those of the first embodiment.

Also in the vacuum boosting device 5 of the second embodiment, the second variable-pressure chamber 48 is shut off from the variable-pressure chamber 24 and the pressure in the second variable-pressure chamber 48 is controlled by the solenoid valve 218 but not shown, whereby the stroke of the brake pedal 11 can be changed variously and therefore can be properly set corresponding to vehicle condition such as load, brake operating condition, road surface condition, and/or a driver. By manipulating the stroke control button, the driver can set the pedal stroke according to the driver's preference.

Figure 5:
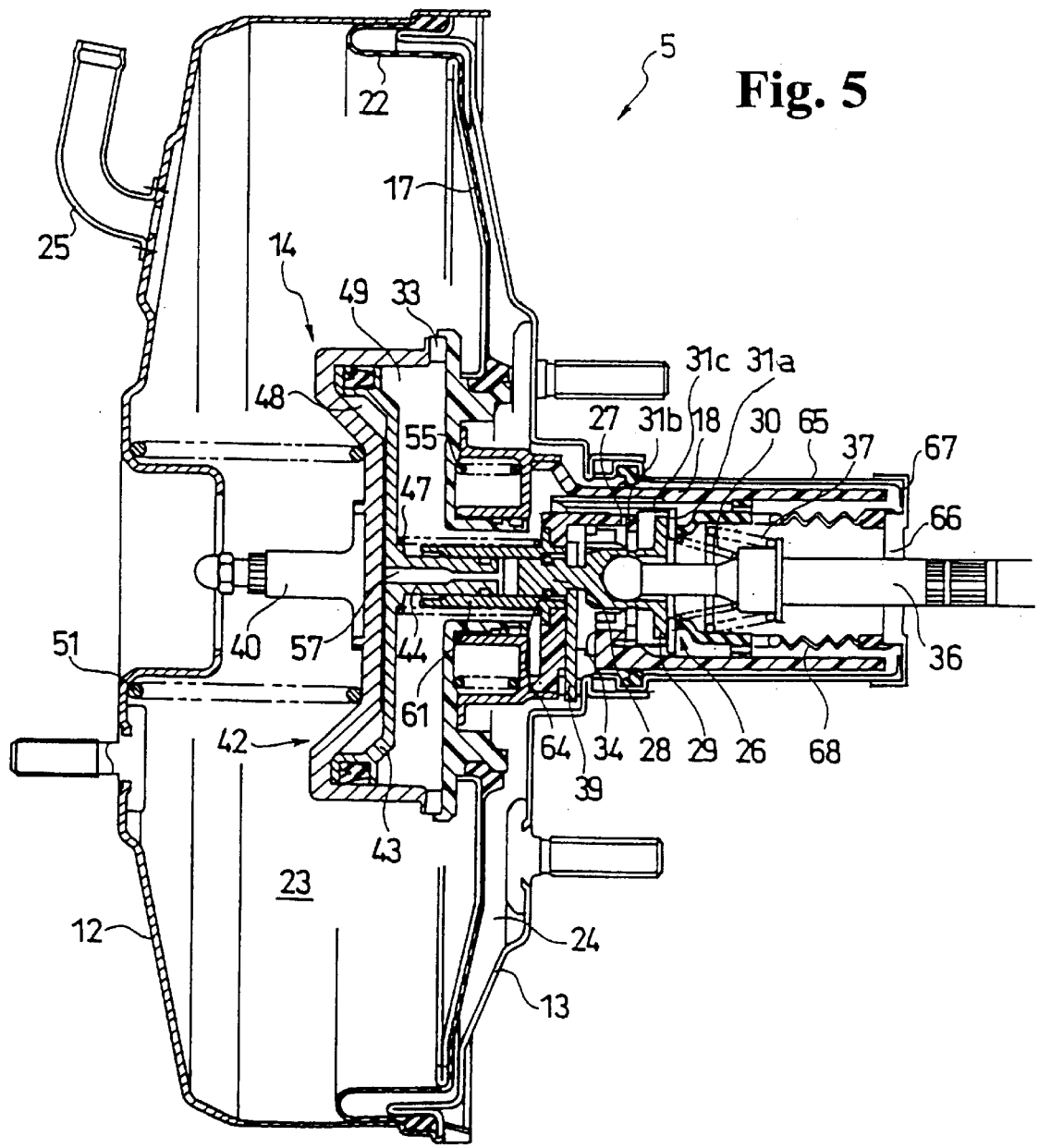
FIG. 5 is a sectional view partly showing a third embodiment of the present invention.

FIG. 5 is a sectional view partially showing the third embodiment of the present invention.

As shown in FIG. 5, the brake system 1 of the third embodiment is different from that of the second embodiment, in that the damper 62 disposed on the front end of the valve plunger 28 is omitted. In addition, the outer surface of the valve body 18 is surrounded by a cylindrical cover 65 connected to the rear shell 13 and a filter 66 is fixed to the rear end of the cylindrical cover 65 in order to cover the rear opening of the cover 65 via a retainer 67. Moreover, bellows 68 is disposed between the rear end of the valve body 31 and the filter 66 and inside of the valve body 18. By the cover 65 and the bellows 68, the valve body 18 is prevented from being directly subjected to the atmosphere.

The valve member 31 is composed of a valve part 31a for the atmosphere valve and a valve part 31b for vacuum valve and the valve parts 31a, 31b are integrally connected to each other by a cylindrical connecting member 31c. The valve seat diameters of the valve parts 31a, 31b are set to be the same as the effective diameter of the bellows 68.

The other structure of the brake system 1 of the third embodiment is the same as that of the second embodiment.

In the third embodiment as structured above, even when the negative pressure in the constant-pressure chamber 23 changes, the relation between the input stroke and the output of the vacuum boosting device 5 is constant, thereby realizing a stable variation of the pedal stroke.

The other action and effects of the brake system 1 of the third embodiment are the same as those of the second embodiment.

Also in the vacuum boosting device 5 of the third embodiment, the second variable-pressure chamber 48 is shut off from the variable-pressure chamber 24 and the pressure in the second variable-pressure chamber 48 is controlled by the solenoid valve but not shown, whereby the stroke of the brake pedal 11 can be changed variously and therefore can be properly set corresponding to vehicle condition such as load, brake operating condition, road surface condition, and/or a driver. By manipulating the stroke control button, the driver can set the pedal stroke according to the driver's preference.

Figure 6:
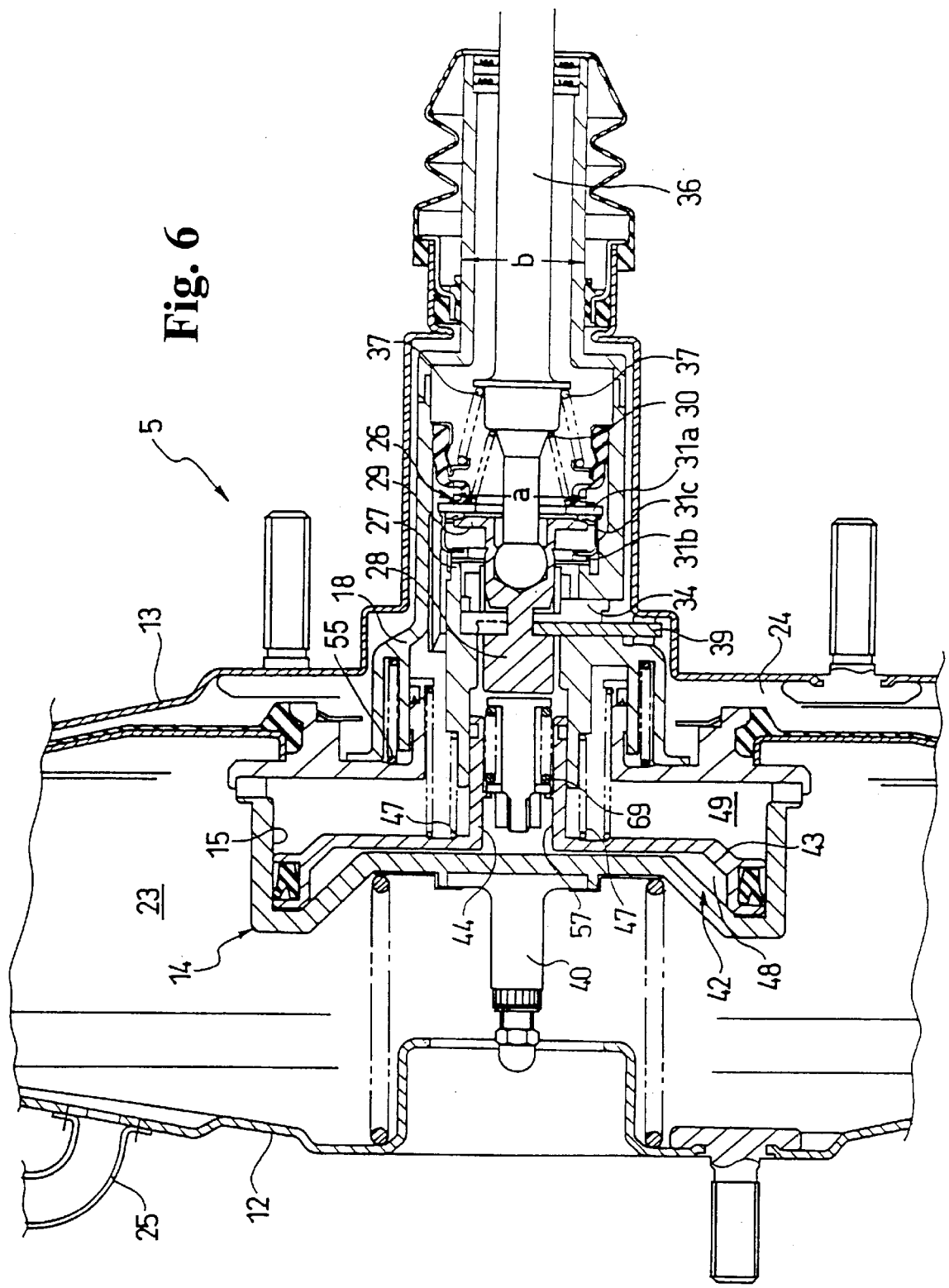
FIG. 6 is a sectional view partly showing a fourth embodiment of the present invention.

FIG. 6 is a sectional view partially showing the fourth embodiment of the present invention.

As shown in FIG. 6, the brake system 1 of the fourth embodiment is different from the second embodiment, in that the damper 62 disposed on the front end of the valve plunger 28 is omitted. In addition, the valve member 31 is composed of a valve part 31a for the atmosphere valve and a valve part 31b for vacuum valve and the valve parts 31a, 31b are integrally connected to each other by a cylindrical connecting member 31c. The valve seat diameter a of the valve part 31a is set to be substantially the same as the outer diameter b of the valve body 18.

The reaction from the reaction piston 43 is divided into two forces received by the first spring 47 and a second spring 69 and the reaction is transmitted to the valve plunger 28 through the second spring 69.

The other structure of the brake system 1 of the fourth embodiment is the same as that of the second embodiment.

In the fourth embodiment as structured above, even when the negative pressure in the constant-pressure chamber 23 changes, the relation between the input stroke and the output of the vacuum boosting device 5 is constant, thereby realizing a stable variation of the pedal stroke.

The other action and effects of the brake system 1 of the fourth embodiment are the same as those of the second embodiment.

Also in the vacuum boosting device 5 of the fourth embodiment, the second variable-pressure chamber 48 is shut off from the variable-pressure chamber 24 and the pressure in the second variable-pressure chamber 48 is controlled by the solenoid valve but not shown, whereby the stroke of the brake pedal 11 can be changed variously and therefore can be properly set corresponding to vehicle condition such as load, brake operating condition, road surface condition, and/or a driver. By manipulating the stroke control button, the driver can set the pedal stroke according to the driver's preference.

Figure 7:
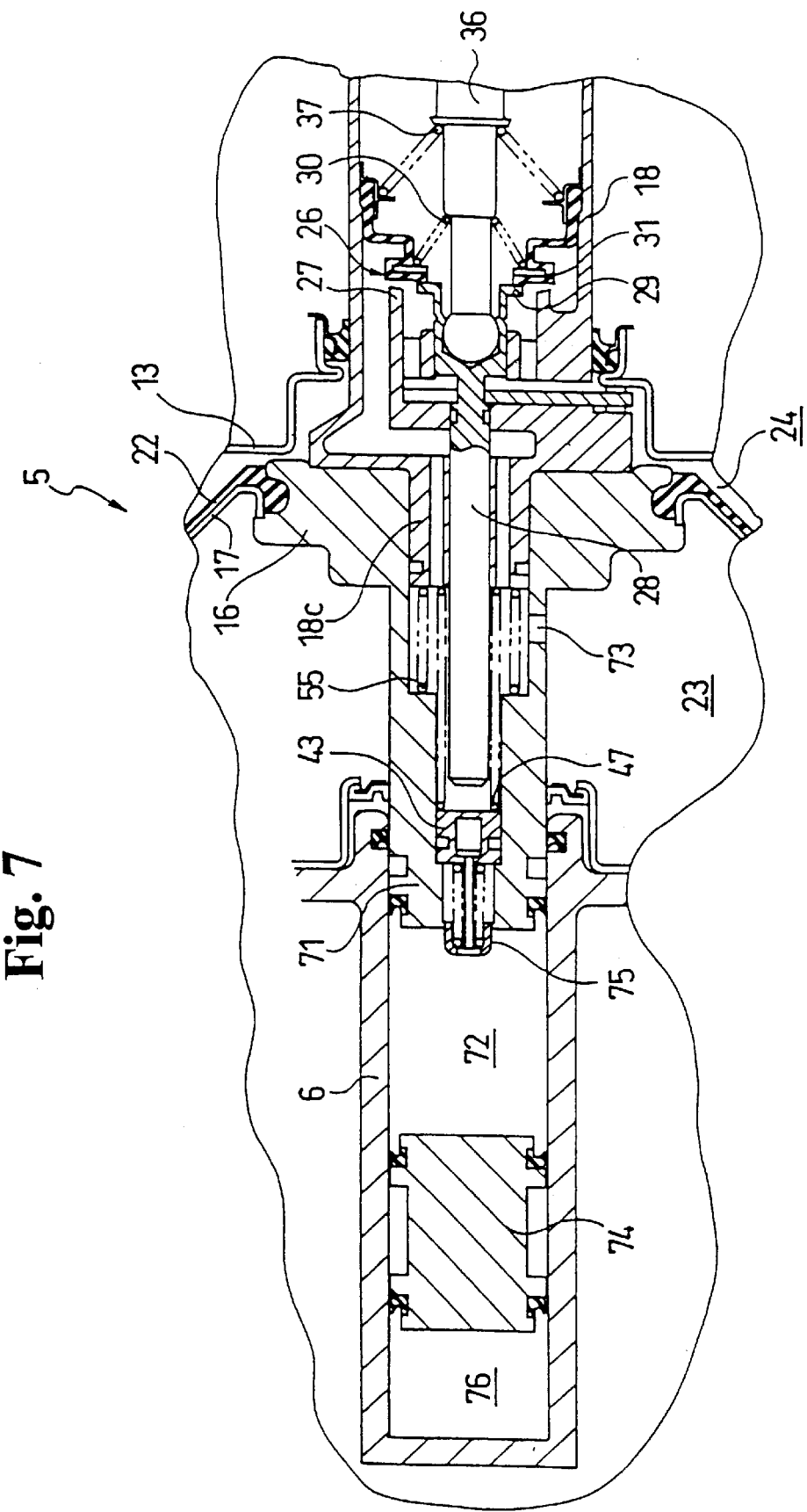
FIG. 7 is a sectional view partly showing a fifth embodiment of the present invention.

FIG. 7 is a sectional view partially showing the fifth embodiment of the present invention.

As shown in FIG. 7, in the brake system 1 of the fifth embodiment, the output shaft 40 of the power piston 14 extends to the inside of the master cylinder 6 and the primary piston 71 of the master cylinder 6 is formed integrally with the front end of the output shaft 40. An axial cylinder hole is formed to extend through the cylinder portion 16 and the output shaft 40. The cylinder hole is a stepped cylinder hole comprising, from the front to the rear, a small cylinder hole, a medium cylinder hole, and a large cylinder hole. The small-diameter portion 18c of the valve body 18 is sealingly and slidably fitted in the large cylinder hole which is positioned at the rear. The reaction piston 43 is sealingly and slidably fitted in the medium cylinder hole which is positioned in the middle. The valve plunger 28 extends forward to the inside of the medium cylinder hole to confront the reaction piston 43 with a space therebetween. Fluid pressure of a primary chamber 72 of the master cylinder 6 acts on the front end of the reaction piston 43 and negative pressure of the constant-pressure chamber 23 always acts on the rear end of the reaction piston 43 through a radial passage 73 formed in the output shaft 40.

The reaction piston 43 is provided with a push member 75 which can be in contact with the secondary piston 74 of the master cylinder 6 in such a manner that the push member 75 can move relative to the reaction piston 43 for a predetermined distance. The push member 75 comes in contact with the secondary piston 74 in the event of the pressure fluid failure of the primary chamber 72 so that the reaction can be obtained by the fluid pressure in the secondary chamber 76.

The other structure of the brake system 1 of the fifth embodiment is the same as that of the first embodiment.

In the brake system 1 of the fifth embodiment as structured above, the vacuum boosting device 5 works by braking operation so that fluid pressure is developed in the primary chamber 72 of the master cylinder 6. The fluid pressure acts on the reaction piston 43 so that the reaction piston 43 retreats against the spring 47 and comes in contact with the valve plunger 28. When the vacuum boosting device 5 is in the middle load state, the atmosphere valve and the vacuum valve in the valve body 18 are both in the closed positions, so the leg power exerted on the valve plunger 28 and the force by the fluid pressure acting on the reaction piston 43 and the spring force of the spring 47 are balanced. On the other hand, as the power piston 14 advances, the valve body 18 is balanced by the forward force due to the pressure difference between the atmospheric pressure acting on the valve body 18 and the pressure in the variable-pressure chamber 24 and the spring force of the spring 55. Therefore, by suitably setting the spring 55, the stroke of the valve body 18 can be shortened relative to the stroke of the power piston 14.

As mentioned above, in the fluid variable stroke means 3 of the fifth embodiment, the output shaft 40 and the input shaft 36 of the vacuum boosting device 5 are structured to move relative to each other and the relative position of the input shaft 36 relative to the output shaft 40 can be changed by the fluid pressure acting on the input shaft 36.

Figure 8:
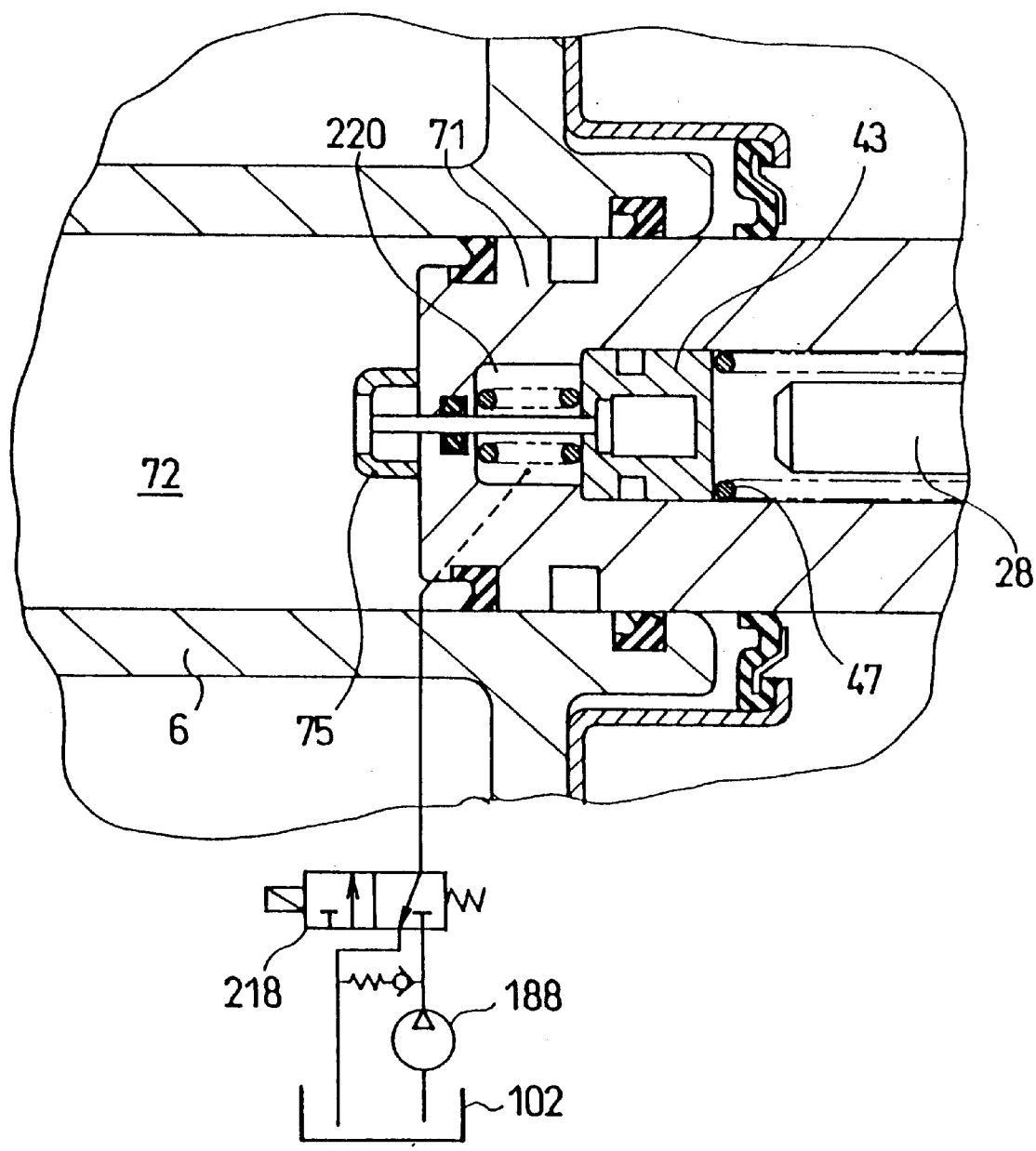
FIG. 8 is a sectional view showing an alternative example of the fifth embodiment shown in FIG. 7.

As shown in FIG. 8, the left pressure-receiving surface of the reaction piston 43 faces a fluid pressure chamber 220 which is sealed and shut off from the primary chamber 72, and the pressure of the fluid pressure chamber 220 is controlled by introducing discharge pressure of a pump 188 into the pressure chamber 220 through the solenoid valve to control the reaction, whereby the stroke of the brake pedal 11 can be changed variously and therefore can be properly set corresponding to vehicle condition such as load, brake operating condition, road surface condition, and/or a driver. By manipulating the stroke control button, the driver can set the pedal stroke according to the driver's preference. The pump 188 is driven only when the brake pedal 11 is pedaled.

The solenoid valve 218 may control to introduce the fluid pressure in the primary chamber 72 into the fluid chamber 220 instead of introducing the discharge pressure of the pump 188 into the fluid chamber 220.

Figure 9:
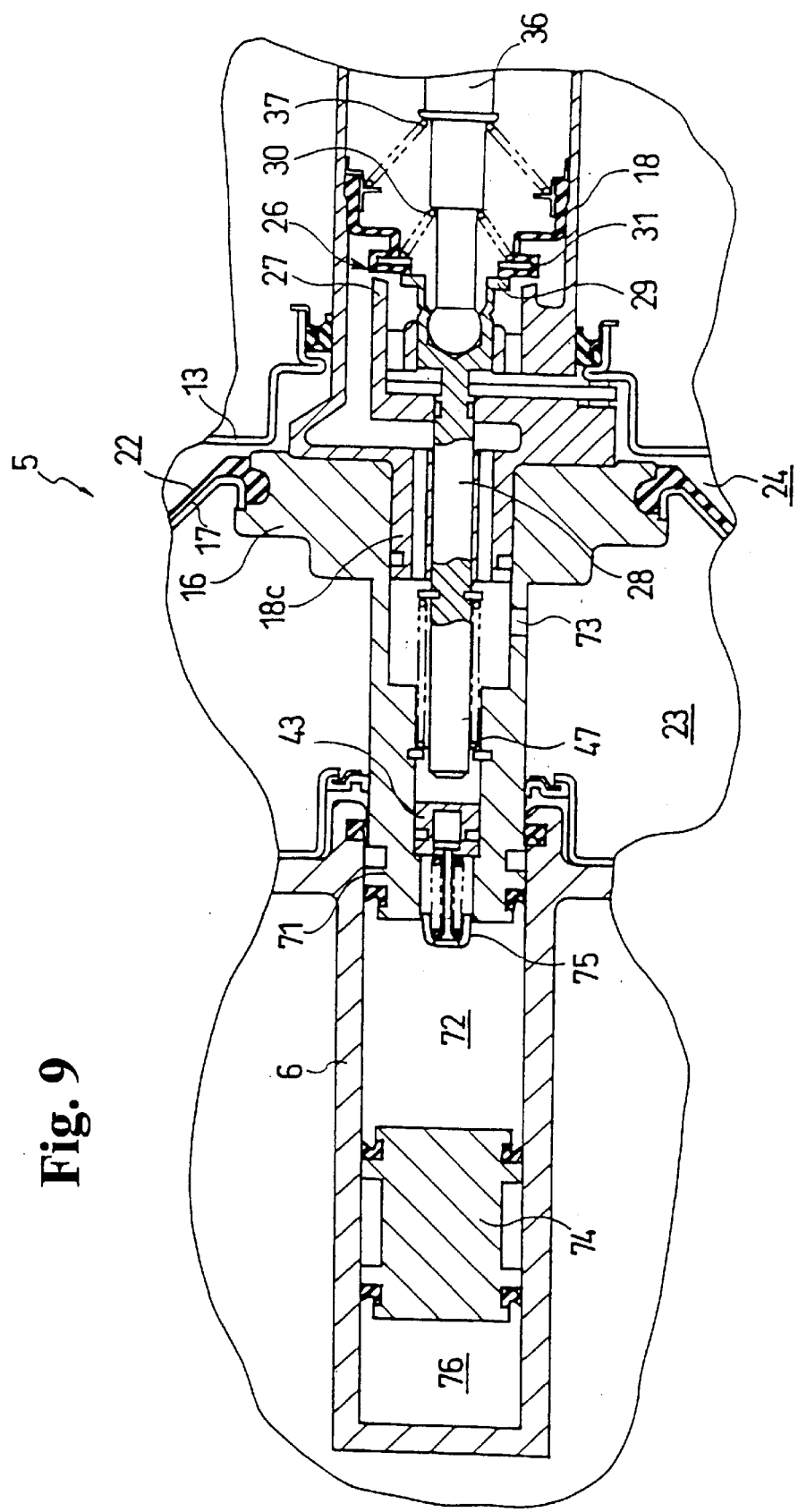
FIG. 9 is a sectional view partly showing a sixth embodiment of the present invention.

FIG. 9 is a sectional view partially showing the sixth embodiment of the present invention.

As shown in FIG. 9, the brake system 1 of the sixth embodiment is different from the fifth embodiment, in that the spring 55 is omitted and that another spring 47 is disposed between the valve plunger 28 and the power piston 14. According to the sixth embodiment, when the leg power on the brake pedal and the force by the fluid pressure of the reaction piston 43 and the spring force of the spring 47 are balanced in the middle load state after the reaction piston 43 comes in contact with the valve plunger 28, the fluid pressure acting on the reaction piston 43 is changed relative to the leg power on the brake pedal, thereby changing the spring force of the spring 47. The spring force of the spring 47 is determined by the relative position between the power piston 14 and the valve body 18. Therefore, by changing the fluid pressure acting on the reaction piston 43 i.e. the reaction of the reaction mechanism of the vacuum boosting device 5, the relative position between the power piston 14 and the valve body 18 can be changed. In the fluid variable stroke means 3 of this embodiment, the power piston 14 of the vacuum boosting device 5 i.e. the output shaft 40 and the valve body 18 i.e. the input shaft 36 are structured to move relative to each other and the reaction of the reaction mechanism can be changed by the fluid pressure. That is, this system corresponds to the system of the first embodiment but employing the fluid pressure instead of the atmospheric pressure.

Also in the vacuum boosting device 5 of the sixth embodiment, in the same manner as that of the embodiment shown in FIG. 8, the fluid pressure chamber 220 shut off from the primary chamber 72 is provided but not shown and the pressure in the fluid pressure chamber 220 is controlled by the solenoid valve 218, whereby the stroke of the brake pedal 11 can be changed variously and therefore can be properly set corresponding to vehicle condition such as load, brake operating condition, road surface condition, and/or a driver. By manipulating the stroke control button, the driver can set the pedal stroke according to the driver's preference.

Figure 10:
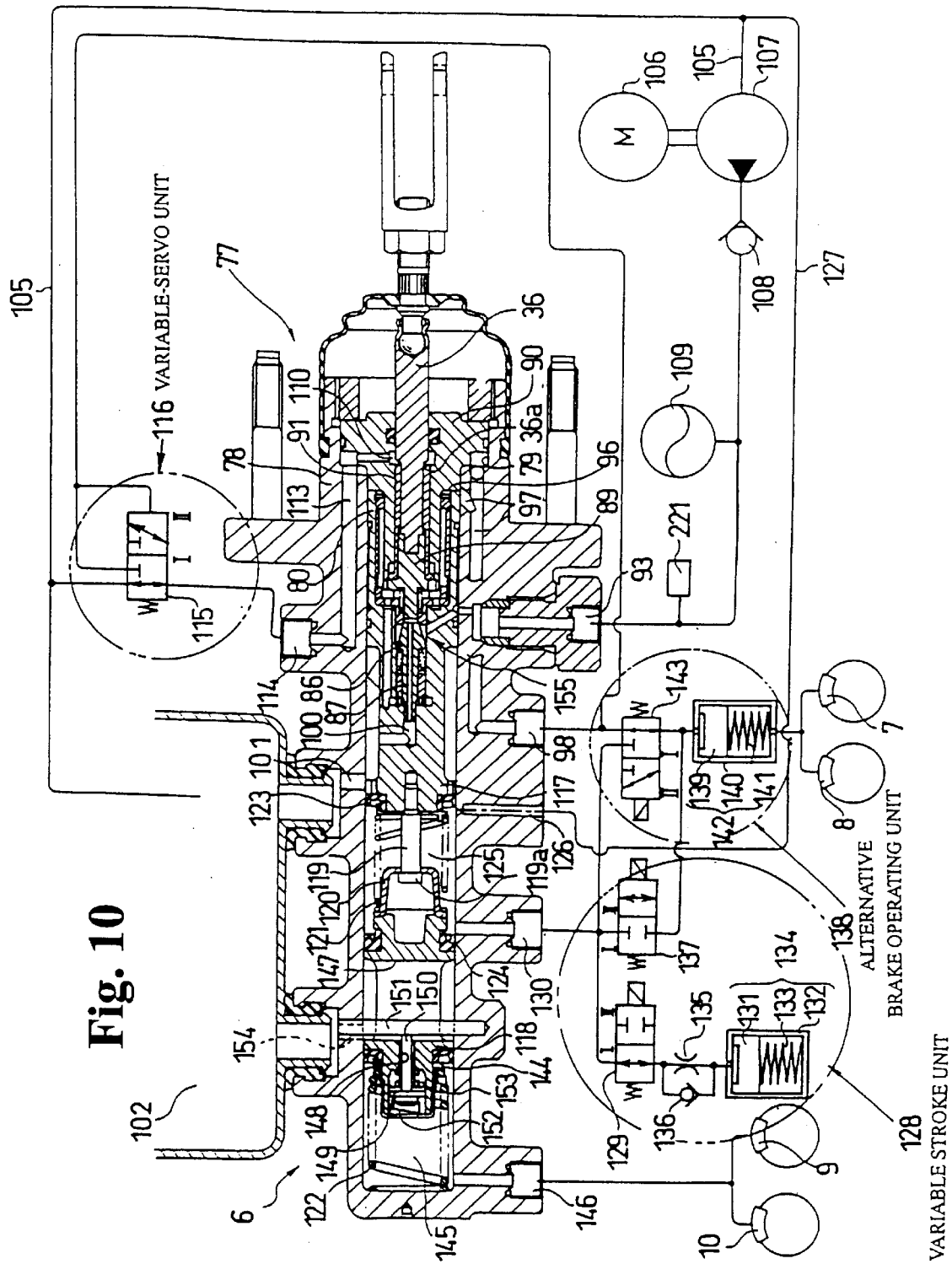
FIG. 10 is a sectional view showing a seventh embodiment of the present invention.
Figure 11:
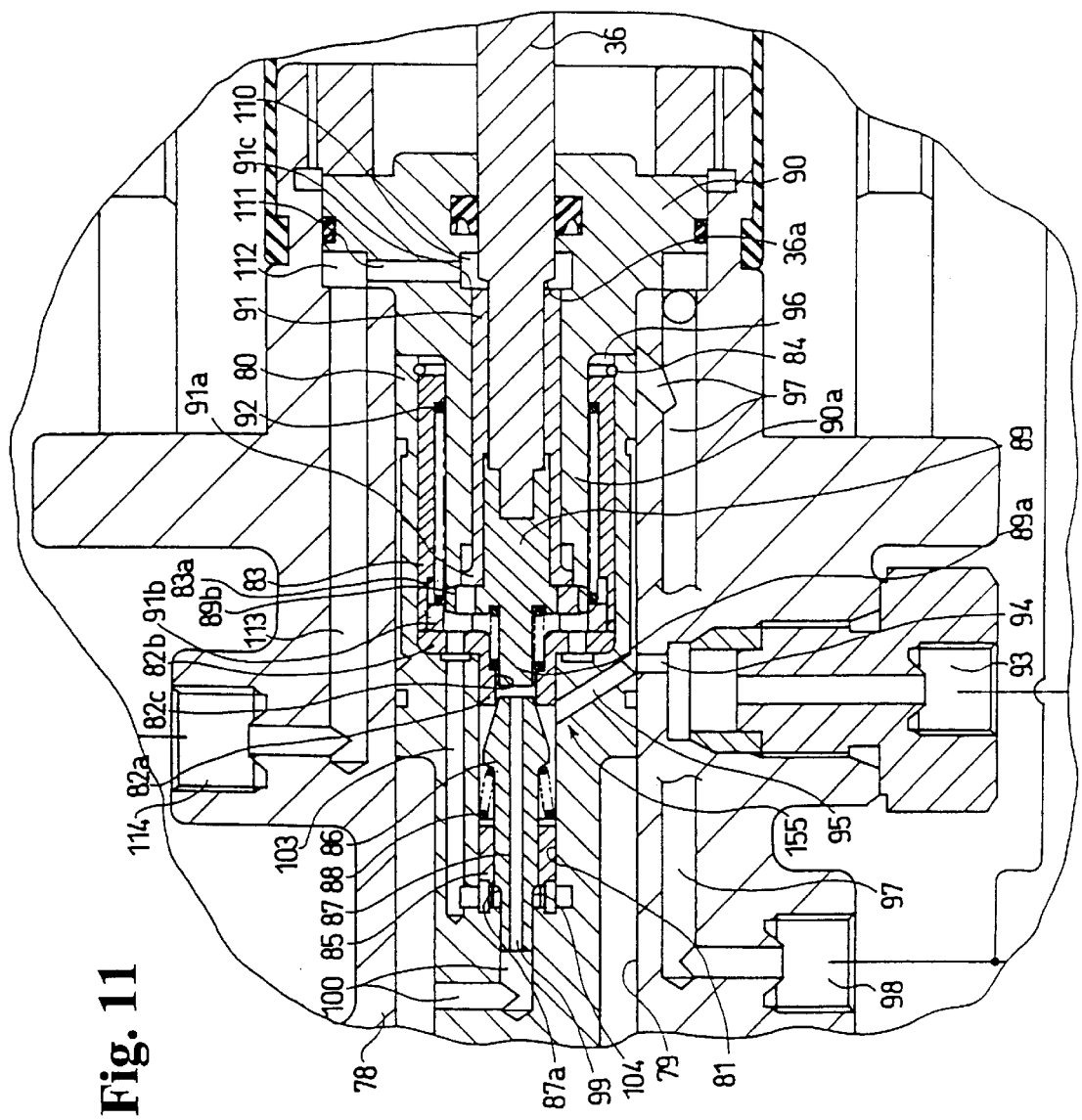
FIG. 11 is a partially enlarged sectional view of the hydraulic boosting device shown in FIG. 10.

FIG. 10 is a sectional view showing the seventh embodiment of the present invention and FIG. 11 is a partial enlarged sectional view of the FIG. 10.

Though any one of the aforementioned embodiments employs the vacuum boosting device 5, the brake system 1 of the seventh embodiment employs a hydraulic boosting device.

In the brake system 1 of the seventh embodiment, as shown in FIG. 10 and FIG. 11, a hydraulic boosting device 77 and the master cylinder 6 are integrally provided and have a common housing 78. The housing 78 has an axial hole 79 in which a power piston 80 is sealingly and slidably disposed and a cylindrical valve seat member 82 having a first valve seat 82a is press fitted. The valve seat member 82 is supported in the axial direction by the cylindrical fixing member 83 which is fixed to the power piston 80 by a C ring 84.

Press fitted into the axial hole 81 is a collar 85 in which a cylindrical valve member 87 is slidably inserted. The valve member 87 is formed integrally with a valve cone 86 and is always biased by a spring 88 in such a direction that the valve cone 86 is seated in the first valve seat 82a of the valve seat member 82. A valve operating member 89 has a second valve seat 89a formed at an end thereof and the second valve seat 89a is disposed in an axial hole 82c of the valve seat member 82 so that the second valve seat 89a can come in contact with the valve cone 86. The valve operating member 89 is fitted on and fixed to the input shaft 36 and has a flange-like stopper 89b formed integrally therewith which is able to be in contact with the end of the small-diameter projection 90b of the plug 90, thereby defining the rearward limitation of the input shaft 36. Compressed and disposed between the valve seat member 82 and the valve operating member 89 is a spring 19 which always biases the valve operating member 89 and the input shaft 36 to the right in the figures. The input shaft 36 sealingly penetrates the plug 90 and is connected to a brake pedal 11 (not shown) at the rear end thereof.

A cylindrical reaction piston 91 is slidably fitted in a space between the peripheral surfaces of the input shaft 36 and the valve operating member 89 and the inner surface of the axial hole of the small-diameter projection 90a of the plug 90. The reaction piston 91 is provided with a first flange 91a and the second flange 91b at the left end thereof in FIG. 14. The left end of the first flange 91a can be contact with the stopper 89b. When the stopper 89b comes into contact with the left end of the first flange 91a, the valve operating member 89 is stopped from moving further rearward against the reaction piston 91.

The right end of the second flange 91b engages the step 83a of the cylindrical fixing member 83 when the reaction piston 91 moves for a predetermined distance rearwardly relative to the power piston 80. Further, the right end 91c of the reaction piston 91 can be in contact with the step 36a of the input shaft 36. Compressed and disposed between the second flange 91b of the reaction piston 91 and the cylindrical fixing member 83 is a spring 92 which biases in such a manner that the second flange 91b of the reaction piston 91 is normally in contact with the flange 82b of the valve seat member 82.

The housing 78 is provided with an input port 93 through which fluid is introduced, and a passage 94 allowing the communication between the input port 93 and the axial hole 79. The power piston 80 is provided with a passage 95 allowing the communication between the passage 94 and the axial hole 81. In this case, the passage 95 opens toward the axial hole 81 between the valve seat member 82 and the collar 85.

A power chamber 96 is formed between the plug 90 and the right end of the power piston 80 and always communicates with the axial hole 82c of the valve seat member 82. Inside the power chamber 96, the stopper 89b of the valve operating member 89 and the first and second flanges 91a, 91b of the reaction piston 91 are positioned, respectively. There is a space between the peripheral surface of the small-diameter projection 90b of the plug 90 and the inner surface of the cylindrical fixing member 83 so that the fluid can freely flow between both axial sides of the cylindrical fixing member 83.

The power chamber 96 always communicates with the output port 98 through a passage 97 formed in the housing 78. The output port 98 always communicates with wheel cylinders 7, 8 relating to one circuit of two brake circuits.

The valve member 87 is provided with an axial hole 99 axially penetrating the valve member 87. The axial hole 99 always communicates with a passage 100 formed in the power piston 80. The passage 100 always communicates with a discharge port 101 formed in the housing 78 through the axial hole 79 and the discharge port 101 always communicates with the reservoir 102.

The power chamber 96 always communicates with a chamber 104 confronting the step 87a of the valve member 87 through a passage 103 formed in the power piston 80.

A hydraulic circuit 105 connecting the input port 93 and the reservoir 102 includes a hydraulic pump 107 driven by a motor 106, and an accumulator 109 on a line at the discharge side of the hydraulic pump 107 via a check valve 108. Predetermined pressure is always accumulated in the accumulator 109 by discharge pressure of the hydraulic pump 107.

The hydraulic boosting device 77 of the embodiment is provided with a reaction chamber 110 formed in the plug 90. The step 36a of the input shaft 36 and the rear end 91c of the reaction piston 91 face the reaction chamber 110. The reaction chamber 110 always communicates with a control pressure inlet 114 through a radial hole 111 formed in the plug 90, an annular space 112 between the housing 78 and the plug 90, and an axial hole 113 formed in the housing 78.

As shown in FIG. 11, the control pressure inlet 114 is connected to a variable-servo unit 116, which is provided with a pressure switching valve 115 composed of a two-position three-way valve. The pressure switching valve 115 switches between a first position I where the control pressure inlet 114 connects to the hydraulic circuit 105 always communicating with the reservoir 102 and a second position II where the control pressure inlet 114 connects to a brake fluid line connecting the output port 98 and the wheel cylinder 7, 8. The pressure switching valve 115 is normally set in the first position I and is set in second position II when the fluid pressure at the output port 98, i.e. the fluid pressure in the power chamber 96, reaches a predetermined working value.

On the other hand, the master cylinder 6 is composed of a tandem master cylinder comprising a primary piston 117 and a secondary piston 118, each of which is set to have the same effective pressure receiving area as that of the power piston 80. The primary piston 117 is formed integrally with the front end of the power piston 80.

A distance restricting rod 119 for restricting the distance between the pistons 117 and 118 is disposed to extend into the piston 118 and is fixed to the piston. A retainer 120 is fitted onto the distance restricting rod 119 such that it is slidable in the axial direction. A spring 121 is compressed and disposed between the retainer 120 and the front end of the primary piston 117 so as to always bias the retainer 120 in a direction moving apart from the primary piston 117. Normally, the retainer 120 is in contact with the head 119a of the distance restricting rod 119 and is restricted not to further move apart from the primary piston 117.

The secondary piston 118 is normally biased rearwardly (toward the right in FIG. 10) by a return spring 122 so that the rear end of the secondary piston 118 is normally in contact with the retainer 126. Cup sealing members 123, 124 are fitted onto the front end of the primary piston 117 and the rear end of the secondary piston 118, respectively, so as to define a fluid chamber 125 in the axial hole 79 between the cup sealing members 123 and 124. The cap sealing members 123, 124 allow the flow from the outside of the fluid chamber 125 to the inside of the fluid chamber 125 and blocks the flow from the inside of the fluid chamber 125 to the outside of the fluid chamber 125.

The housing 78 is provided with a fluid compensating port 126 for the master cylinder, which is connected with a fluid line 127, which is branched from the hydraulic circuit 105. When the primary piston 117 is in the inoperative position, the cup sealing member 123 is positioned between the discharge port 101 -and the fluid compensating port 126. Therefore, when the system is inoperative, the fluid freely flows between the fluid chamber 125 and the fluid compensating port 126 in the both directions. As the power piston 80 advances and the cup sealing member 123 passes over the fluid compensating port 126, the flow from the fluid chamber 125 to the fluid compensating port 126 is shut off.

A variable stroke unit 128 is connected to a connection port 130 through a first solenoid shut-off valve 129 thereof and the connection port 130 always communicates with the fluid chamber 125. The first solenoid shut-off valve 129 has a communicating position I and a shut-off position II and is normally set in the communicating position I, i.e. a normally open valve. The variable stroke unit 128 comprises a stroke simulator 134 for ensuring the pedal stroke having a piston 131, a cylinder 132, and a spring 133, an orifice 135 disposed between a connection port 130 and the stroke simulator 134, and a check valve 136 disposed on a line bypassing the orifice 135 for allowing only the flow from the stroke simulator 134 to the connection port 130.

The variable stroke unit 128 is provided with a second solenoid shut-off valve 137 disposed on a line connecting the connection port 130 and the pressure transducer 142 as described later. The second solenoid shut-off valve 137 has a shut-off position I and a communicating position II and is normally set in the shut-off position I, i.e. a normally closed valve. The first and second solenoid shut-off valves 129, 137 are controlled by an electronic control unit.

An alternative brake operating unit 138 is disposed on a fluid line connecting the output port 98 of the hydraulic boosting device 77 and the wheel cylinders 7, 8 relating to the one circuit in order to ensure the braking operation of the one circuit in case of failure in the fluid pressure sources such as the pump 107 and the accumulator 109. The alternative brake operating unit 138 comprises a pressure transducer 142 having a piston 139, a cylinder 140, and a spring 141, and a solenoid switching valve 143 composed of a two-position three-way valve.

When the pressurized fluid fed from the power chamber 96 or the fluid chamber 125 is introduced into the pressure transducer 142, the piston 139 is actuated to develop brake pressure which is in turn introduced into the wheel cylinders 7, 8. In case that the fluid pressure failure is a result of failure in the wheel cylinders 7, 8, the pressure transducer 142 prevents the fluid discharged from the power chamber 96 or the fluid chamber 125 from flowing out the damaged portion.

The solenoid switching valve 143 is controlled by a pressure sensor 221 which detects the fluid pressure in the accumulator 109. The solenoid switching valve 143 has a first position I for connecting the pressure transducer 142 to the output port 98 and a second position II for connecting the pressure transducer 142 to the connection port 130. When the fluid pressure is in normal state, the solenoid switching valve 143 is set in the first position I. In case of the fluid pressure failure, the solenoid switching valve 143 is switched to the second position II. The secondary piston 118 of the master cylinder 6 is slidably inserted into the axial hole 79 of the housing 78 in such a manner that the secondary piston 118 is sealed in one direction by a cup sealing member 144 disposed in a front end of the secondary piston 118.

A fluid chamber 145 is defined in the axial hole 79 by the secondary piston 118 and always communicates with the wheel cylinders 9, 10 relating to the other circuit of the two brake circuits. A radial hole 147 and an axial hole 148 communicating with the radial hole 147 are formed in the secondary piston 118. Inserted into the axial hole 148 is a valve rod 150 having a valve 149 at the end thereof. The valve rod 150 can be in contact with a valve release rod 151 radially penetrating the axial hole 79 of the housing 78 and a radial hole 147 formed in the secondary piston 118. Further, the valve 149 is always biased by a spring 152 in a direction sitting in a valve seat 153. When the secondary piston 118 is in the inoperative position as illustrated, the valve rod 150 is in contact with the valve release rod 151 so that the valve 149 is spaced apart form the valve seat 153 against the spring force of the spring 152 so as to allow the communication between the reservoir 102 and the fluid chamber 145. When the secondary piston 118 advances, the valve 149 is seated in the valve seat 153 by the spring force of the spring 152 and the valve rod 150 is spaced apart from the valve release rod 151 so as to intercept the communication between the reservoir 102 and the fluid chamber 145, thereby producing master cylinder pressure.

The housing 78 is provided with a passage 154 always communicating with the reservoir 102 so that the axial hole 148 of the secondary piston 118 always communicates with the reservoir 102 through the radial hole 147, the axial hole 79, and the passage 154.

In this way, the brake system 1 of the ninth embodiment comprises, as one brake circuit, a full-power brake system in which the fluid pressure of the power chamber 96 is introduced into the wheel cylinders 7, 8, and, as the other brake circuit, semi-full-power brake system in which the master cylinder pressure is introduced into the wheel cylinders 9, 10.

The description will now be made as regard to the operation of the brake system 1 of the seventh embodiment.

Figure 13:
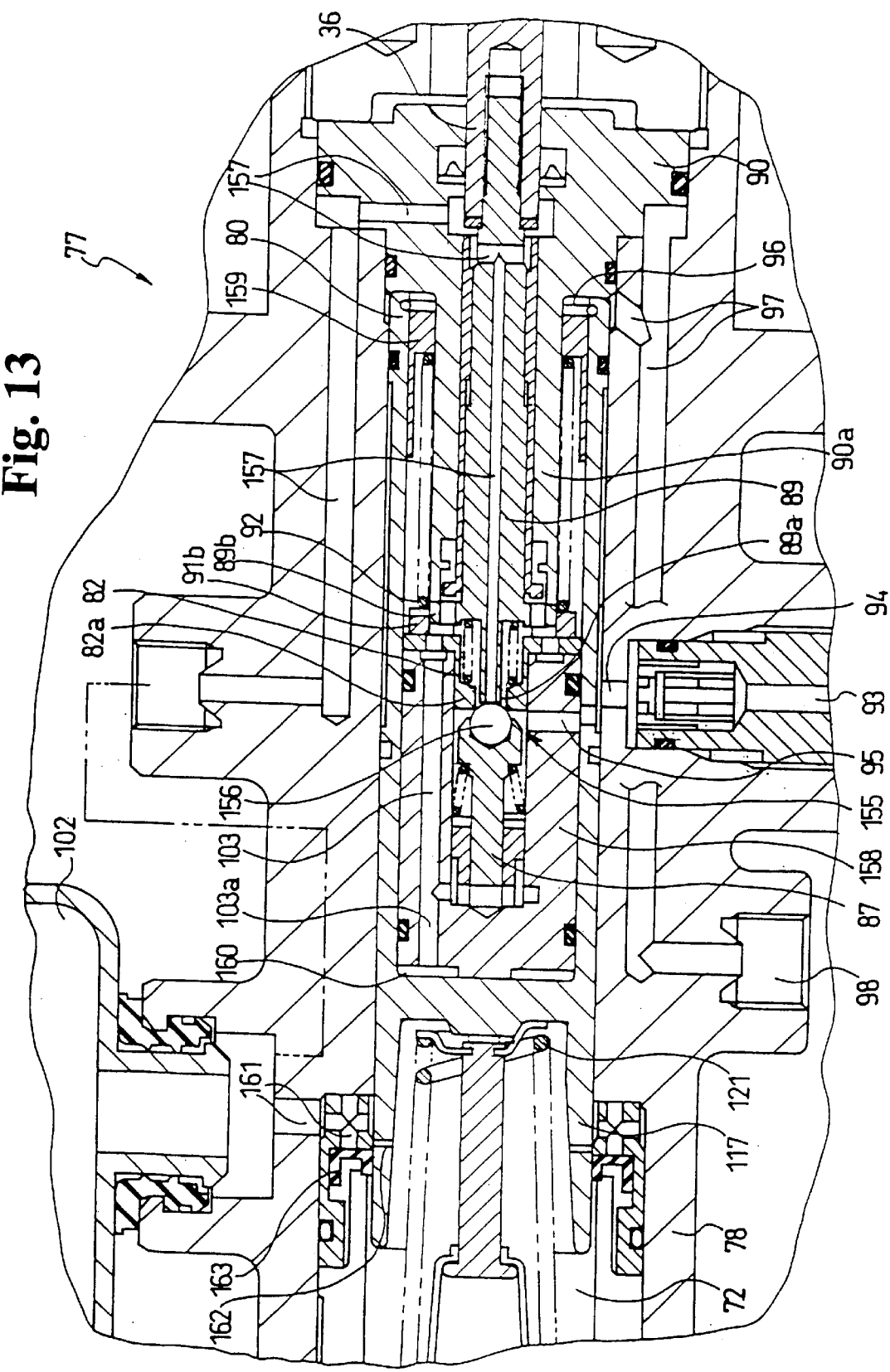
FIG. 13 is a partially enlarged sectional view of the hydraulic boosting device shown in FIG. 12.
Figure 14:
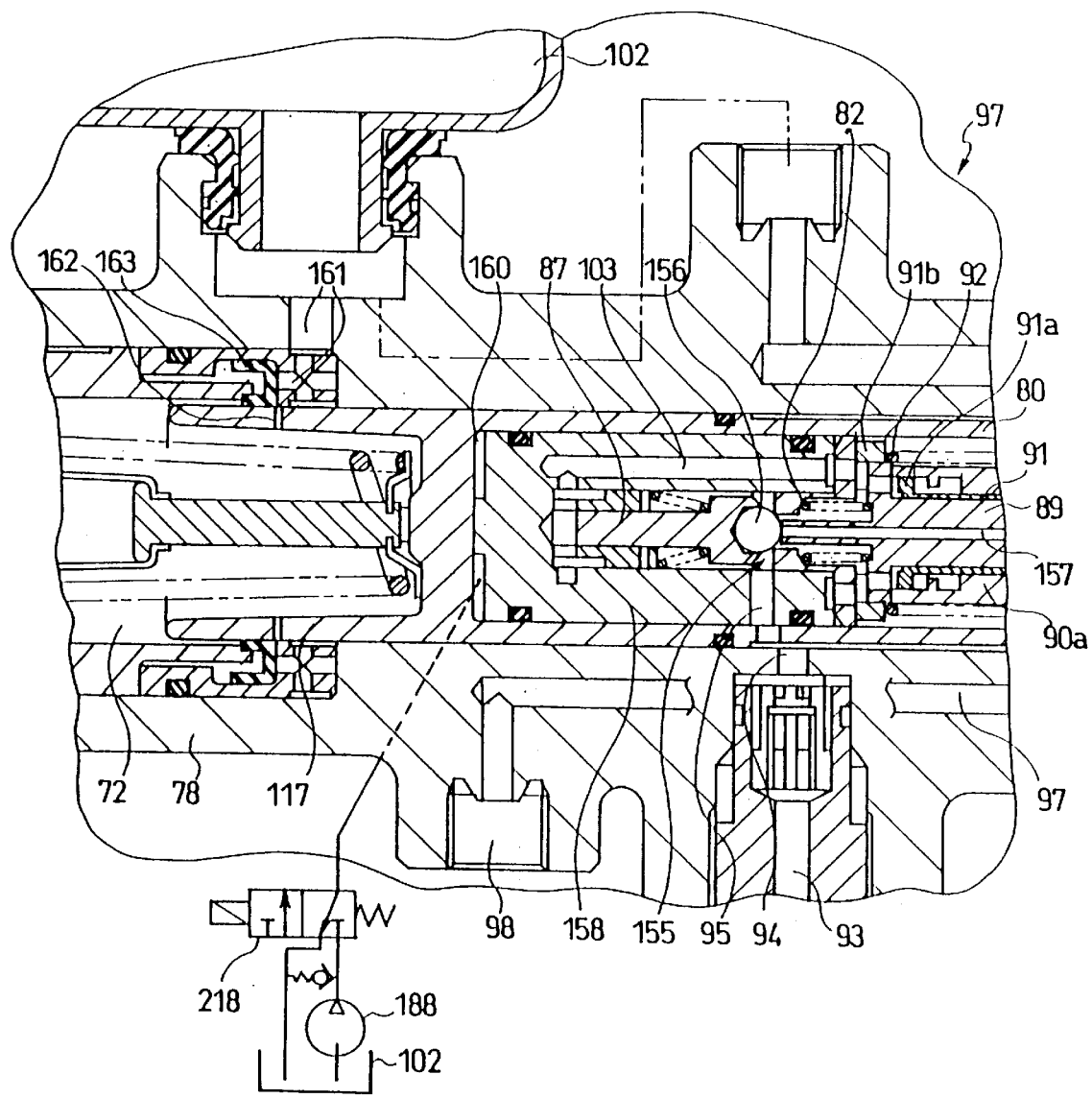
FIG. 14 is a view showing an alternative example of the eighth embodiment shown in FIG. 12.

When the brake system 1 is inoperative where the brake pedal 11 is not pedaled, the valve cone 86, the first valve seat 82a of the valve seat member 82, and the second valve seat 89a of the valve operating member 89 are in the positional relation as shown in FIGS. 13 and 14. That is, the valve cone 86 is seated in the first valve seat 82a of the valve seat member 82 and the second valve seat 89a of the valve operating member 89 is spaced apart form the valve cone 86. In this state, the axial hole 82c of the valve seat member 82 is shut off from the passage 95 which always communicates with the input port 93, and communicates with the axial hole 99 of the valve member 87 which always communicates with the discharge port 101. Therefore, when the brake system is inoperative, the power chamber 96 is shut off from the pump 107 and the accumulator 109 and communicates with the reservoir 102 so that no pressurized fluid is supplied to the power chamber 96.

The rear end 91c of the reaction piston 91 is spaced apart from the step 36a of the input shaft 36. The stopper 89b of the valve operating member 89 is in contact with the small-diameter projection 90a of the plug 90 and is spaced apart from the first flange 91a of the reaction piston 91, i.e. in a position ahead of the first flange 91a.

Further, the cup sealing member 123 of the primary piston 117 is positioned behind the fluid compensating port 126 so that the fluid chamber 125 is connected to the reservoir 102.

On the other hand, in the master cylinder 6, the valve rod 150 comes in contact with the valve release rod 151 and the valve 149 is separated from the valve seat 153. Therefore, the fluid chamber 145 is connected to the reservoir 102.

Further, the pressure switching valve 115 of the variable-servo unit 116 is in the first position I as illustrated and the reaction chamber 110 communicates with the reservoir 102. The respective solenoid valves 129, 137, 143 of the variable stroke unit and the alternative brake operating unit 138 are all in the respective first positions I or the inoperative positions.

As the brake pedal 11 is pedaled for starting the normal braking operation, the input shaft 36 advances so that the second valve seat 89a of the valve operating member 89 is brought in contact with the valve cone 86 and the valve cone 86 is spaced apart from the first valve seat 82a of the valve seat member 82. This state allows the communication between the passage 95 and the axial hole 82c of the valve seat member 82 and intercepts the communication between the axial hole 82c of the valve seat member 82 and the axial hole 99 of the valve member 87. Therefore, the power chamber 96 is shut off from the reservoir 102 and communicates with the pump 107 and the accumulator 109 so that the pressurized fluid of the accumulator 109 is supplied to the power chamber 96. In this case, the valve cone 86, the first valve seat 82a, and the second valve seat 89a compose a control valve 155 of the hydraulic boosting device 77 which controls to selectively switch the power chamber 96 to communicate with the pump 107 and the accumulator 109 as the pressurized fluid source or with the reservoir 102.

As the fluid pressure is introduced into the power chamber 96, the power piston 80 is biased forward. As the fluid pressure in the power chamber 96 reaches a value overcoming the spring force of the return spring 121, the power piston 80 advances by the fluid pressure and the secondary piston 118 also advances. The advance of the secondary piston 118 seats the valve 149 in the valve seat 153 to develop master cylinder pressure in the fluid chamber 145. The fluid pressure in the power chamber 96 is introduced into the pressure variable cylinder 142 through the passage 97 and the output port 98 so as to activate the piston 139 to develop the brake fluid pressure. The brake fluid pressure is introduced into the wheel cylinders 7, 8 relating to the one circuit. At the same time, the master cylinder pressure is introduced into the wheel cylinders 9, 10 relating to the other circuit.

In the initial stage where the fluid pressure in the power chamber 96 is relatively small so that the reaction piston 91 still not retreats against the spring force of the spring 92. Therefore, the rear end 91e of the reaction piston 91 is not yet brought into contact with the step 36a of the input shaft 36. In this state, the servo control at a relatively high servo ratio is performed. That is, jumping action is performed.

As the fluid pressure in the power chamber 96 is increased until play in strokes of the brake system is cancelled and the respective wheel cylinders substantially produce braking forces, the reaction piston 91 moves rearward against the spring force of the spring 92 so that the rear end 91c of the reaction piston 91 comes in contact with the step 36a of the input shaft 36. In this state, the servo control at a relatively low servo ratio for normal braking is performed. In this way, the normal braking is conducted at both circuits. At this point, since the effective pressure receiving area of the power piston 80 on which the fluid pressure in the power chamber 96 acts and the effective pressure receiving area of the master cylinder piston 113 on which the master cylinder pressure in the fluid chamber 145 is applied are equal to each other, the fluid pressure in the power chamber 96 and the master cylinder pressure are balanced to be equal. Therefore, the pressure of the pressurized fluid supplied to the wheel cylinders 7, 8, 9, 10 should be equal.

The fluid pressure in the power chamber 96 is introduced into the chamber 104 through the axial passage 103 and the fluid pressure in the chamber 104 acts on the step 129a of the valve member 87, thereby biasing the valve member 87 in a direction opposite to the fluid pressure of the power chamber 96.

As the primary piston 117 advances and the cup sealing member 123 passes over the fluid compensating port 126, the fluid chamber 125 is shut off from the reservoir 102 and is thus sealed. At this point, since the primary piston 117 advances larger than the secondary piston 118, the fluid in the fluid chamber 125 is transmitted to the stroke simulator 134 of the variable stroke unit 128 through the connection port 130, the first solenoid valve 129, and the orifice 135. Because of the normal braking operation, the primary piston 117 advances at a normal speed, so the orifice effect by the orifice 135 to the fluid flowing toward the stroke simulator 134 is small. Therefore, the primary piston 117 i.e. power piston 80 moves at the normal speed for a distance corresponding to the stroke of the piston 131, i.e. fluid absorbed by the stroke simulator 134. Therefore, the pedal stroke for the normal operation is a stroke based on the sum of the play of strokes of wheel cylinders 9, 10 and the fluid absorbed by the stroke simulator 134.

As the reaction of the input shaft 36 becomes equal to the input of the input shaft 36, the valve cone 86 is seated in the first valve seat 82a of the valve seat member 82 and also in the second valve seat 89a of the valve operating member 89 so that the power chamber 96 is shut off from both from the accumulator 109 and the reservoir 102 and becomes in the balanced state in the middle load state. As the input of the input shaft 36 further rises, the valve cone 86 is separated from the first valve seat 82a again and further fluid is supplied to the power chamber 96 so that the fluid pressure in the power chamber 96 is further increased. After that, by repeating the seating and separating of the valve cone 86 relative to the first valve seat 82a, the fluid pressure in the power chamber 96 is increased corresponding to the increase in the input of the input shaft 36.

In this state, the hydraulic boosting device 77 performs the servo control at a relatively low servo ratio for the normal braking.

During this servo control, the fluid pressure in the power chamber 96 does not rise to the working pressure of the pressure switching valve 115 until the input reaches a predetermined value. Therefore, the pressure switching valve 115 is still in the first position I and the reaction chamber 110 is still connected to the reservoir 102.

The wheel cylinders 7, 8; 9, 10 produce braking forces, i.e. the boosted forces relative to the input of the input shaft 36, and the vehicle is braked by this braking forces. At this point, the fluid pressure in the power chamber 96 and the master cylinder pressure are balanced to be equal to each other so that the braking forces produced by the respective wheel cylinders 7, 8; 9, 10 are also equal.

As the input reaches the predetermined value and the fluid pressure in the power chamber 96 reaches the working pressure of the pressure switching valve 115, the pressure switching valve 115 is switched to the second position II. Then, the reaction chamber 110 is connected to brake fluid lines between the output port 98 and the alternative brake operating unit 138 so that the fluid pressure in the output port 98, i.e. the pressurized fluid in the power chamber 96 is introduced into the reaction chamber 110. The introduced fluid pressure in the reaction chamber 110 acts on a portion of the rear end 91c of the reaction piston 91 being in contact with the step 36a of the input shaft 36 in the same direction as the input applied to the input shaft 36. Accordingly, the reaction acting on the input shaft 36 is reduced and, after that, the increase in the output of the hydraulic boosting device 77 is larger than that in case of the servo control for normal braking relative to the input of the input shaft 36. That is, the hydraulic boosting device 77 performs the servo control in such a manner that the input of the input shaft 36 is boosted at a relatively high servo ratio. Accordingly, the wheel cylinders 7, 8; 9, 10 produce braking forces larger than that of normal braking. In this way, the hydraulic boosting device 77 has a reversed two-stage servo characteristic allowing the servo control at a servo ratio higher than that for normal braking after the input exceeds the predetermined value.

As a result of further increase in the input, the fluid pressure in the power chamber 96 reaches the maximum setting pressure at which pressure is accumulated in the accumulator 109. From this point, the fluid pressure in the power chamber 96 is no more increased, so the hydraulic boosting device 77 finishes the servo control at the high servo ratio and becomes in the full-load state. After that, the output of the hydraulic boosting device 77 increases in proportion to the input without magnification.

As the braking action is canceled by releasing the brake pedal 11, the input shaft 36 and the valve operating member 89 retreat rightward, the second valve seat 89a of the control valve 155 is moved apart from the valve cone 86, and the pressurized fluid in the power chamber 96 is discharged into the reservoir 102 through the axial hole 82c of the valve seat member 82, the space between valve cone 86 and second valve seat 89a, the axial hole 99 of the valve member 87, the passage 100, the small-diameter portion 4a of the stepped hole 4, and the discharge port 101. At this point, the input shaft 96 retreats largely until the stopper 89b of the valve operating member 89 comes into contact with the stopper 91c of the reaction piston 91, so the second valve seat 89a is largely spaced apart from the valve cone 86 so that the pressurized fluid in the power chamber 96 is quickly discharged.

Because of the discharge of the pressurized fluid in the power chamber 96, the pressurized fluid in both the wheel cylinders 7, 8 relating to the one circuit is also quickly discharged into the reservoir 102 through the power chamber 96 so that the fluid pressure in the wheel cylinders 7, 8 is reduced. On the other hand, the secondary piston 118, the primary piston 117, and the power piston 80 rapidly retreats by the spring force of the return spring 122. At this point, while the primary piston 117 retreats larger than the secondary piston 118 because of the spring force of the return spring 121, the fluid supplied to the stroke simulator 134 is returned to the fluid chamber 125 by the check valve 136 without delay so the primary piston 117, the power piston 80, and the input shaft 36 are returned to the inoperative positions without delay even with the orifice 135.

As the secondary piston 118 retreats, the fluid pressure in the fluid chamber 145 and the fluid pressures in both the wheel cylinders 9, 10 relating to the other circuit are also reduced. After the valve rod 150 comes in contact with the valve release rod 151, the retreat of the secondary piston 118 moves the valve 149 apart from the valve seat 153 so that the fluid chamber 145 communicates with the reservoir 102. Therefore, the pressurized fluid in the wheel cylinders 9, 10 is also quickly discharged into the reservoir 102 through the fluid chamber 145 so that the fluid pressure in the wheel cylinders 9, 10 is further reduced. In this way, the braking action of both the circuits quickly begins to be canceled.

As the fluid pressure in the power chamber 96 becomes lower than the preset working pressure of the pressure switching valve 115, the pressure switching valve 115 is switched to the first position I so that the reaction chamber 110 communicates with the reservoir 102. As a result, the output of the hydraulic boosting device 77 is decreased at the lower servo ratio for the normal braking relative to the decrease in the input.

As the input shaft 36 further retreats until the braking action is substantially canceled, the stopper 89b of the valve operating member 89 comes into contact with the end of the small-diameter projection 90a of the plug 90, so the input shaft 36 and the valve operating member 89 no more retreat, i.e. both the input shaft 36 and the valve operating member 89 reach their rearmost limits. Even after the input shaft 36 and the valve operating member 89 are stopped, the power piston 80, the reaction piston 91, the valve cone 86, and the valve seat member 82 still retreat. Therefore, the stopper 89b of the valve operating member 89 departs from the first flange 91a of the reaction piston 91 and the valve cone 86 is closer to the second valve seat 89a of the valve operating member 89.

As the right end of the power piston 80 comes into contact with the plug 90, the retreat of the power piston 80 is stopped so that the secondary piston 118 and the power piston 80 are in the inoperative positions, thereby quickly and completely canceling the braking action. In this state, since the cup sealing member 123 of the primary piston 117 is positioned behind the fluid compensating port 126, the chamber 125 is connected to the reservoir 102 through the fluid compensating port 126, the fluid passage 127, and the hydraulic circuit 105.

When the power piston 80 is in the inoperative position, the valve cone 86 is extremely close to the second valve seat 89a of the valve operating member 89 so that the space between the valve cone 86 and the second valve seat 89a becomes quite small, i.e. the valve cone 86 is immediately before the seating. As the brake pedal is pedaled and the input shaft 36 and the valve operating member 89 advance, the second valve seat 89a immediately comes into contact with the valve cone 86 and the valve cone 86 immediately moves apart from the first valve seat 82a of the valve seat member 82. That is, the play in stroke for the switching operation of the control valve 155 is extremely reduced, thereby quickly obtaining braking action.

In this way, the braking action can be quickly obtained by the braking operation and the braking action can be quickly canceled by canceling the braking operation, so the hydraulic boosting device 77 has improved responsiveness.

When the driver pedals the brake pedal at a high speed for emergency braking, the power piston 80 and the primary piston 117 advance quickly, so the fluid in the fluid chamber 125 is about to be quickly supplied to the stroke simulator 134 through the connection port 130. However, because of the orifice effect by the orifice 135, the supply to the stroke simulator 134 is delayed so that the pedal stroke becomes smaller than the normal case. The fluid pressure in the fluid chamber 125 is increased for the delay of the supply to the stroke simulator 134. At this point, since the effective pressure receiving areas of the secondary piston 118, the primary piston 117, the power piston 80 are equal to each other so that the fluid pressure in the power chamber 96 and the fluid pressure in the fluid chamber 145 become high pressure equal to the fluid pressure of the fluid chamber 125.

The high fluid pressure in the power chamber 96 is introduced to the pressure transducer 142 through the output port 98, so the piston 139 of the pressure transducer 142 operates to develop high brake pressure which is in turn introduced into the wheel cylinders 7, 8. As a result of this, the wheel cylinders 7, 8 produce large braking force. On the other hand, the high master cylinder pressure is introduced into the wheel cylinders 9, 10, so the wheel cylinders 9, 10 produce large braking force. In this manner, the hydraulic boosting device 77 can produce large braking force from small pedal stroke by the presence of the orifice 135 in the event of emergency braking.

As mentioned above, in the hydraulic boosting device 77 of the ninth embodiment, the pedal stroke can be changed corresponding to the speed of pedaling the brake pedal by the orifice 135. When pedaling the brake pedal rapidly, the hydraulic boosting device 77 can develop large output with a small stroke of the input shaft 36 by the variable stroke unit 128, thereby speeding up the build up of braking force and enabling the quick development of large braking force in both circuits. As the fluid pressure of the fluid pressure sources such as the pump 107 and the accumulator 109 fail, the electronic control unit sets the solenoid switching valve 143 to the second position II. In this state, even when the driver pedals the brake pedal for normal braking to move the input shaft 36 forward to switch the control valve 155, no fluid pressure is introduced into the power chamber 96. The power piston 80 is never operated by the fluid pressure of the power chamber 96 under the circumstances. As the brake pedal is further largely pedaled and the input shaft 36 thus largely advances, the valve operating member 89 reaches the maximum stroke and comes in contact with the valve seat member 82 so as to start to push the power piston 80. The primary piston 117 formed integrally with the power piston 80 advances. As the cup sealing member 123 of the primary piston 117 passes over the fluid compensating port 126, fluid pressure is developed in the fluid chamber 125 and is then introduced into the pressure transducer 142 via the connection port 130 and the solenoid switching valve 143. After that, the braking action of the one circuit is obtained in the same manner as the normal braking as mentioned above.

The pedal stroke at this point is larger than the pedal stroke during the normal braking operation for the play in the strokes of the wheel cylinders 7, 8.

In the alternative braking action for the fluid pressure failure, the advance of the primary piston 117 causes the secondary piston 118 to advance and the valve 149 is seated in the valve seat 153 as mentioned above to develop fluid pressure in the fluid chamber 145. The fluid pressure in the fluid chamber 145 is introduced into the wheel cylinders 9, 10 relating to the other circuit via the output port 146, whereby the braking action of the other circuit is obtained. Since the effective pressure receiving areas of the front and rear ends of the secondary piston 118 are equal to each other, the fluid pressure in the fluid chamber 125 becomes equal to the fluid pressure in the fluid chamber 145. As a result, braking forces of both circuits are equal to each other.

The braking action for the fluid pressure failure is cancelled by releasing the brake pedal in the same manner as the case of normal braking. The release of the brake pedal causes the power piston 80 and the primary piston 117 to retreat so that the fluid pressure of the fluid chamber 125 is reduced and thus the braking force for the one circuit is reduced. The secondary piston 118 also retreats so that the fluid pressure in the fluid chamber 145 is reduced and thus the braking force for the other circuit is also reduced. As the primary piston 117 further retreats in such a manner that the cup sealing member 123 passes over the fluid compensating port 126, the fluid chamber 125 communicates with the fluid compensating port 126. That is, the fluid chamber 125 communicates with the reservoir 102, whereby the fluid pressure in the fluid chamber 125 and the fluid pressure in the pressure transducer 142 are discharged into the reservoir 102. As a result, the braking action of the one circuit is completely cancelled. Since the secondary piston 118 also further retreats, the valve 149 moves apart form the valve seat 153 in the same manner as the case of canceling normal braking so that the fluid chamber 145 communicates with the reservoir 102. As a result, the braking action of the other circuit is also completely cancelled.

In this manner, the hydraulic boosting device 77 of the seventh embodiment can securely produce braking forces in both the circuits in the event of the pressure fluid failure.

In the seventh embodiment, the pedal stroke can be changed by controlling the switch of the solenoid valves 129, 137, 143. That is, when the solenoid valves 129, 137, 143 are all in the respective inoperative positions, the pedal stroke is the same as that during normal braking operation.

When only the first solenoid valve 129 is actuated to be set in the shut-off position II, the fluid chamber 125 is shut off from the stroke simulator 134. As the cup sealing member 123 of the primary piston 117 passes over the fluid compensating port 126, the fluid chamber 125 is in the locked state. In this state, the pedal stroke becomes a distance corresponding only the stroke of the other circuit on the secondary piston 118 side of the master cylinder 6.

When the first and second solenoid shut-off valves 129, 137 and the solenoid switching valve 143 are actuated to be set in the positions II together, the pressure transducer 142 is shut off from the power chamber 96 and is connected to the fluid chamber 125 and the fluid chamber 125 is shut off from the stroke simulator 134. The pedal stroke at this point is a distance corresponding to the strokes of the wheel cylinders 7, 8, 9, 10.

When the second solenoid shut-off valve 137 and the solenoid switching valve 143 both operate to be set in the positions II and the first solenoid valve 129 is inoperative, the pressure transducer 142 is shut off from the power chamber 96 and is connected to the fluid chamber 125 and the fluid chamber 125 is connected to the stroke simulator 134. Therefore, the pedal stroke is a distance corresponding to the sum of the pedal stroke during the normal operation of the ninth embodiment and the strokes of the wheel cylinders 7, 8.

In this manner, the pedal stroke can be changed by controlling the operation of the solenoid valves 129, 137, 143. The pedal stroke can be more properly set corresponding to vehicle condition such as load, brake operating condition, road surface condition, and/or a driver in the same manner as the aforementioned embodiment. By manipulating the stroke control button, the driver can set the pedal stroke according to the driver's preference. The electronic control unit suitably controls the solenoid valves 129, 137, 89 to set the pedal stroke properly according to a manipulate signal of the stroke control button.

As mentioned above, in the brake system 1 of the seventh embodiment, the fluid chamber 125 of the fluid variable stroke means 3 is provided between the power piston 80 of the hydraulic boosting device 77 and the piston 144 of the master cylinder 6 and the pressure in the fluid chamber 125 is suitably controlled by the solenoid valves 129, 137, 147, thereby changing the pedal stroke to a desired distance at any time or whenever necessary.

Figure 12:
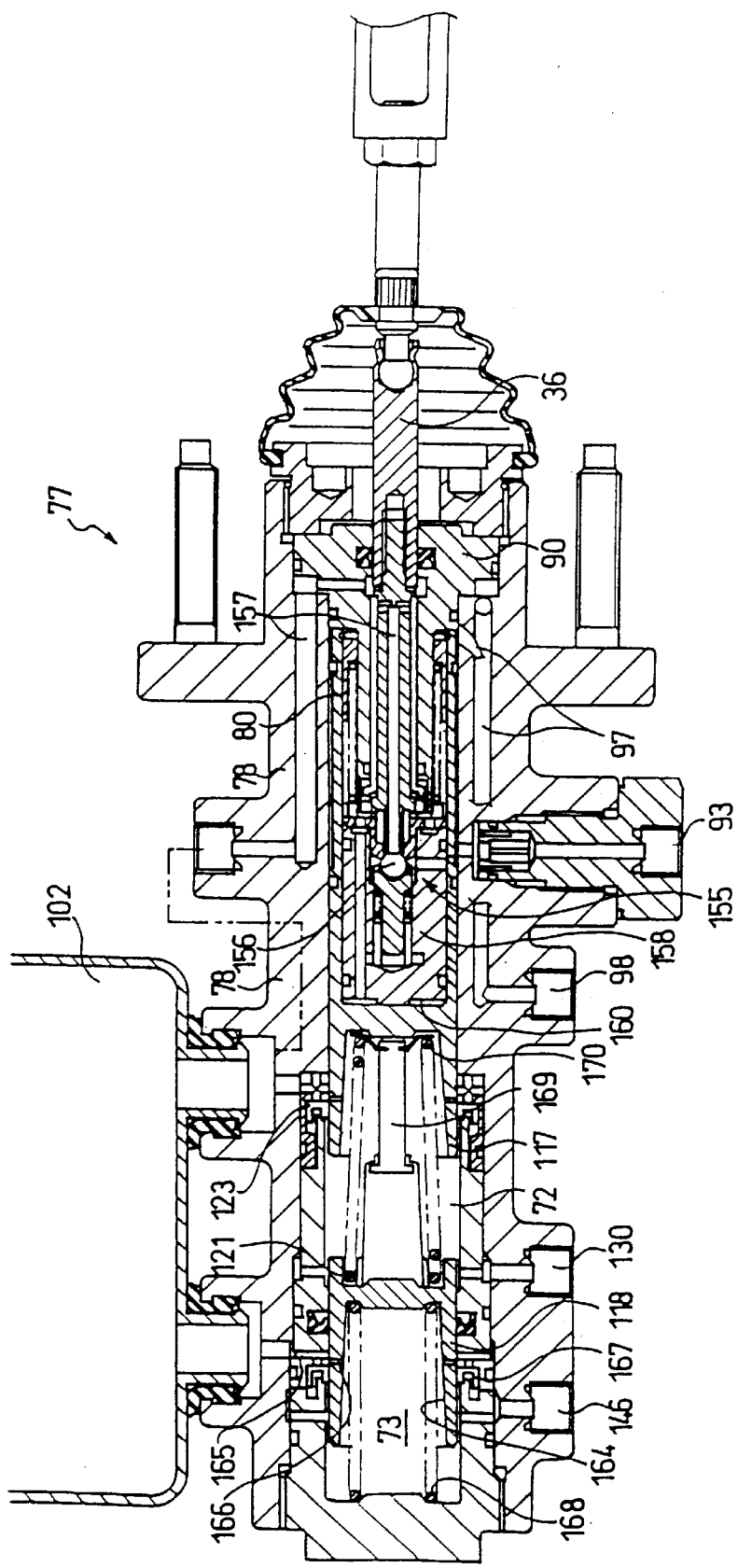
FIG. 12 is a sectional view showing an eighth embodiment of the present invention.

FIG. 12 is a sectional view showing the eighth embodiment of the present invention and FIG. 13 is an partial enlarged sectional view of the FIG. 12.

The brake system 1 of the eighth embodiment is a system employing the hydraulic boosting device 77 just like the ninth embodiment. As shown in FIG. 12 and FIG. 13, in the hydraulic boosting device 77 of the tenth embodiment, a valve ball 156 is employed instead of the valve cone 86 of the control valve 155 of the ninth embodiment, and a discharge passage 157 for discharging the fluid of the power chamber 96 to the reservoir 102 for canceling the braking operation is formed in the valve operating member 89, the plug 90, and the housing 78.

The hydraulic boosting device 77 of the eighth embodiment include a control valve accommodating sleeve 158, which is provided separately from the power piston 80, for accommodating the valve ball 156 and the valve member 87. The control valve accommodating sleeve 158 is sealingly and slidably disposed in the axial hole of the power piston 80. The valve seat member 82 is press fitted into the axial hole 81 of the control valve accommodating sleeve 158. In this case, the cylindrical fixing member 83 of the seventh embodiment is omitted and, instead of the cylindrical fixing member 83, a retainer 159 supporting one end of the spring 92 is provided. A fluid pressure chamber 160 is defined between the front end of the control valve accommodating sleeve 158 and the power piston 80 and always communicates with the power chamber 96 through the passage 103 and the extension 103a of the latter.

The primary piston 117 is formed integrally with the front end of the power piston 80 and has a radial hole 162 formed in the front end portion thereof for connecting the primary chamber 72 to the reservoir 102 through the passage 161 of the housing 78. The radial hole 162 is positioned slightly behind a cup sealing member 163 to allow the communication between the primary chamber 72 and the reservoir 102 when the primary piston 117 is inoperative as illustrated. When the primary piston 117 advances and the radial hole 162 passes over the cup sealing member 163, the radial hole 162 intercepts the communication between the primary chamber 72 and the reservoir 102.

The secondary piston 118 of the master cylinder 6 is formed in a cylindrical shape having an axial hole 164 which opens toward the secondary chamber 73, and a bottom. The secondary piston 118 is provided, at the front end, with a radial hole 166 for connecting the secondary chamber 73 to the reservoir 102 through the passage 165 of the housing 78. The radial hole 166 is positioned slightly behind the cup sealing member 167 to allow the communication between the secondary chamber 73 and the reservoir 102 when the primary piston is inoperative as illustrated. When the secondary piston 118 advances and the radial hole 166 passes over the cup sealing member 167, the radial hole 166 intercepts the communication between the secondary chamber 73 and the reservoir 102.

Compressed and disposed between the secondary piston 118 and the housing 78 is a return spring 168. Further, compressed and disposed between the primary piston 117 and the secondary piston 118 is a return spring 170 of which the maximum length is restricted by a distance adjusting member 169.

The primary chamber 72 is connected to the wheel cylinders 7, 8 relating to one circuit and the secondary chamber 73 is connected to the wheel cylinders 9, 10 relating to the other circuit.

The other structure of the brake system 1 of the eighth embodiment is the same as that of the seventh embodiment but the variable-servo unit 116, the variable stroke unit 128 and the alternative brake operating unit 138 of the seventh embodiment are omitted.

In the brake system 1 of the eighth embodiment as structured above, during the normal braking operation, pressurized fluid is introduced in the power chamber 96 in the same manner as the seventh embodiment. However, the pressurized fluid is also introduced into the fluid pressure chamber 160 through the passage 103 and the extension 103a. Therefore, the fluid pressure of the fluid pressure chamber 160 is applied to the front end of the control valve accommodating sleeve 158 and the fluid pressure of the power chamber 96 is applied to the rear end of the control valve accommodating sleeve 158. In this case, in the balanced state in the middle load region, the valve ball 156 is seated in both the first valve seat 82a and the second valve seat 89a so that the pressure receiving area of the rear end of the control valve accommodating sleeve 158 on which the fluid pressure of the power chamber 96 is applied is smaller than that of the front end of the control valve accommodating sleeve 158 for a seated area between the valve ball 156 and the second valve seat 89a. Therefore, the difference between these pressure receiving areas produces a difference between forces by the fluid pressure acting on the front and rear ends of the control valve accommodating sleeve 158. By the difference of forces, the control valve accommodating sleeve 158 is biased rearwardly when the brake system is operative. Therefore, the control valve accommodating sleeve 158 slides rearwardly relative to the power piston 80 to a position where the biasing force and the spring force of the spring 92 are balanced.

As mentioned above, the position of the control valve accommodating sleeve 158 relative to the power piston 80 is changed so that the position of the control valve 155 is also changed. The change in the position of the control valve 155 changes the stroke of the input shaft 36 i.e. the pedal stroke of the brake pedal 11. Therefore, the pedal stroke is changed corresponding to the difference between the forces by the fluid pressure acting on the front and rear ends of the control valve accommodating sleeve 158, thereby changing the stroke.

Also in the fluid variable stroke means 3 of the brake system 1 of the eighth embodiment, the power piston 80 of the hydraulic boosting device 77, i.e. the output shaft 40, and the control valve sleeve 158, i.e. the input shaft 36, are movable relative to each other and the relative position between the output shaft 40 and the input shaft 36 is controlled by fluid pressure, whereby the pedal stroke can be changed by the fluid pressure. In the tenth embodiment, the fluid pressure for controlling the pedal stroke is the fluid pressure in the power chamber 96 whereby as the leg power on the brake pedal is increased, the stroke of the input shaft 36 relative to that of the output shaft 40 can be reduced.

The other action and effects of the brake system 1 of the eighth embodiment are substantially the same as those of the seventh embodiment.

Though the fluid pressure chamber 160 is connected to the power chamber 96 through the passage 103 and the extension 103a in the eighth embodiment, the extension 103a of the passage 103 may be omitted not to allow the direct communication between the fluid pressure chamber 160 and the power chamber 96 as shown in FIG. 14, the fluid pressure chamber 160 is connected to the pump 188 through the solenoid valve 218, and the solenoid valve 218 is controlled by an electronic control unit to control the pressure of the fluid pressure chamber 160 in the same manner as the embodiment shown in FIG. 8, whereby the pedal stroke can be changed variously and therefore can be properly set corresponding to vehicle condition such as load, brake operating condition, road surface condition, and/or a driver. By manipulating the stroke control button, the driver can set the pedal stroke according to the driver's preference.

Figure 15:
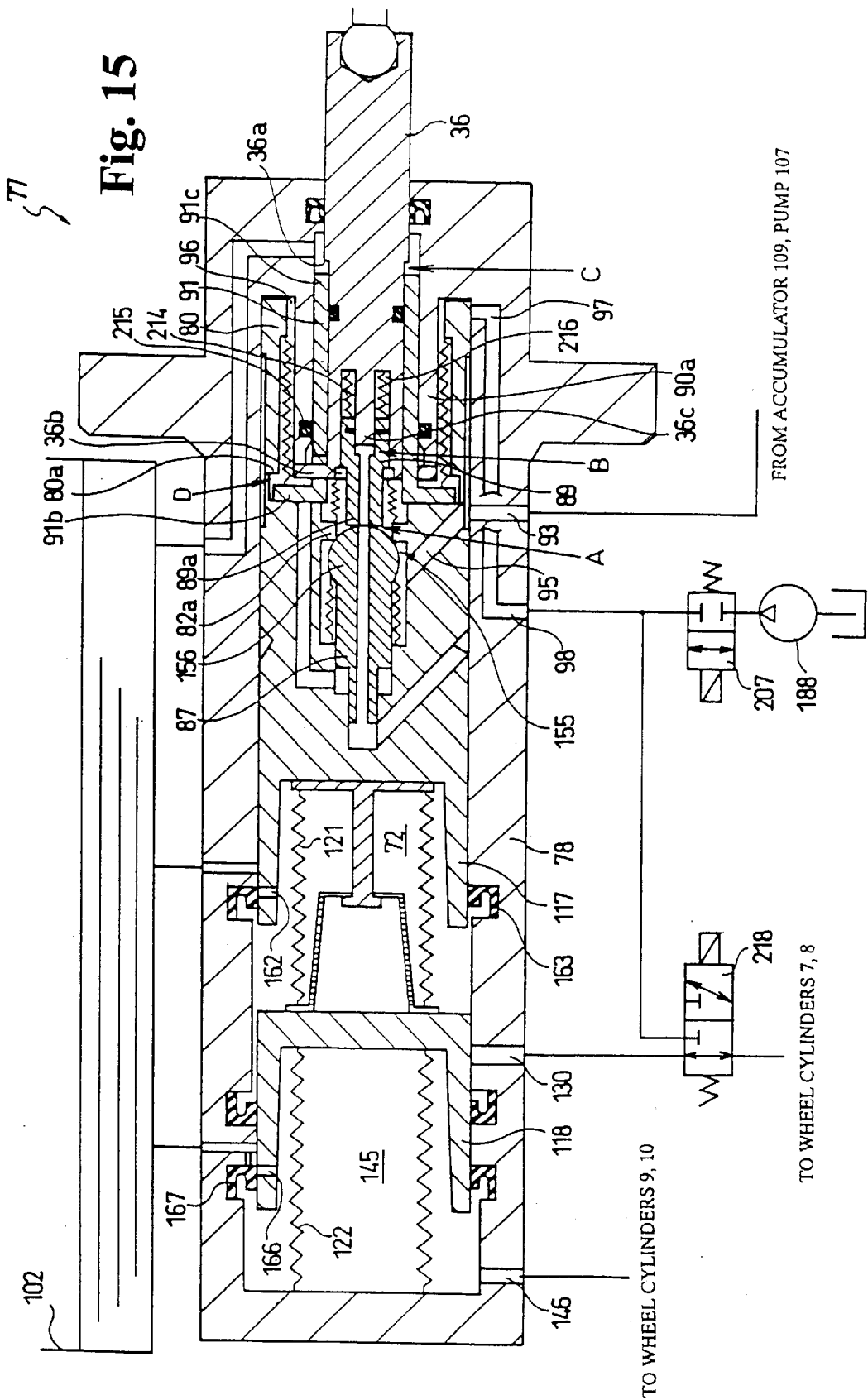
FIG. 15 is a view schematically showing a ninth embodiment of the present invention.

FIG. 15 is a view schematically showing the ninth embodiment of the present invention.

In the eighth embodiment, the pedal stroke can be changed by moving rearwardly the control valve accommodating sleeve 158 accommodating the control valve 155 therein. In the brake system 1 of the ninth embodiment, however, the input-output characteristics of the hydraulic boosting device 77 is mechanically provided with hysteresis and, by utilizing the hysteresis in the input-output characteristics, the brake pressure is intensified by using fluid pressure by a pump and the pedal stroke is changed.

As shown in FIG. 15, in the hydraulic boosting device 77 of the ninth embodiment, the valve operating member 89 is disposed to the front end of the input shaft 36 in such a manner that it can move relative to the input shaft 36. The valve operating member 89 is always biased forward by a spring 214 and is restricted from further moving forward by the stopper 215 fixed to the front end of the input shaft 36. The valve operating member 89 is always restricted from further moving rearwardly by coming in contact with a center front projection 36c of the input shaft 36. The spring 214 is disposed in a chamber 216 which communicates with the power chamber 96 through a space around the valve operating member 89.

Spaces in the inoperative state as illustrated are set as follows. That is, the spaces: a space A between the valve ball 156 and the valve operating member 89; a space B of the valve operating member 89 and the input shaft 36; a space C between the rear end of the reaction piston 91 and the step 36*a* of the input shaft 36; and a space D between the second flange 91*b* of the reaction piston 91 and the step 80*a* of the power piston 80, are set to satisfy the following equation:

$$C<A>D>C-A-B \qquad (1)$$

In order to provide jumping characteristics to the hydraulic boosting device 77, the rear end 91*c* of the reaction piston 91 should come in contact with the step 36*a* of the input shaft 36 before the second flange 91*b* of the reaction piston 91 comes in contact with the step 80*a* of the power piston 80 during the braking operation. The spaces must be set such that the space C becomes smaller than the space D when both the space A and the space B become 0 in the balanced state in the middle load state during the braking operation. That is, the following equation must be satisfied:

$$D>C-(A+B) \qquad (2)$$

In order to provide the hysteresis to the hydraulic boosting device 77, the servo ratio in the operation release direction (the return) should be higher than that in the operative direction. To make the servo ratio higher, the rear end 91*c* of the reaction piston 91 must be separated from the step 36*a* of the input shaft 36 during the return. That is, the following equation must be satisfied:

$$D<C-A \qquad (3)$$

To satisfy the equations (2) and (3), consequently, the spaces A through D must be set to satisfy the equation (1) as mentioned above.

The other structure of the brake system of the ninth embodiment is the same as that of the eighth embodiment.

Figure 16:
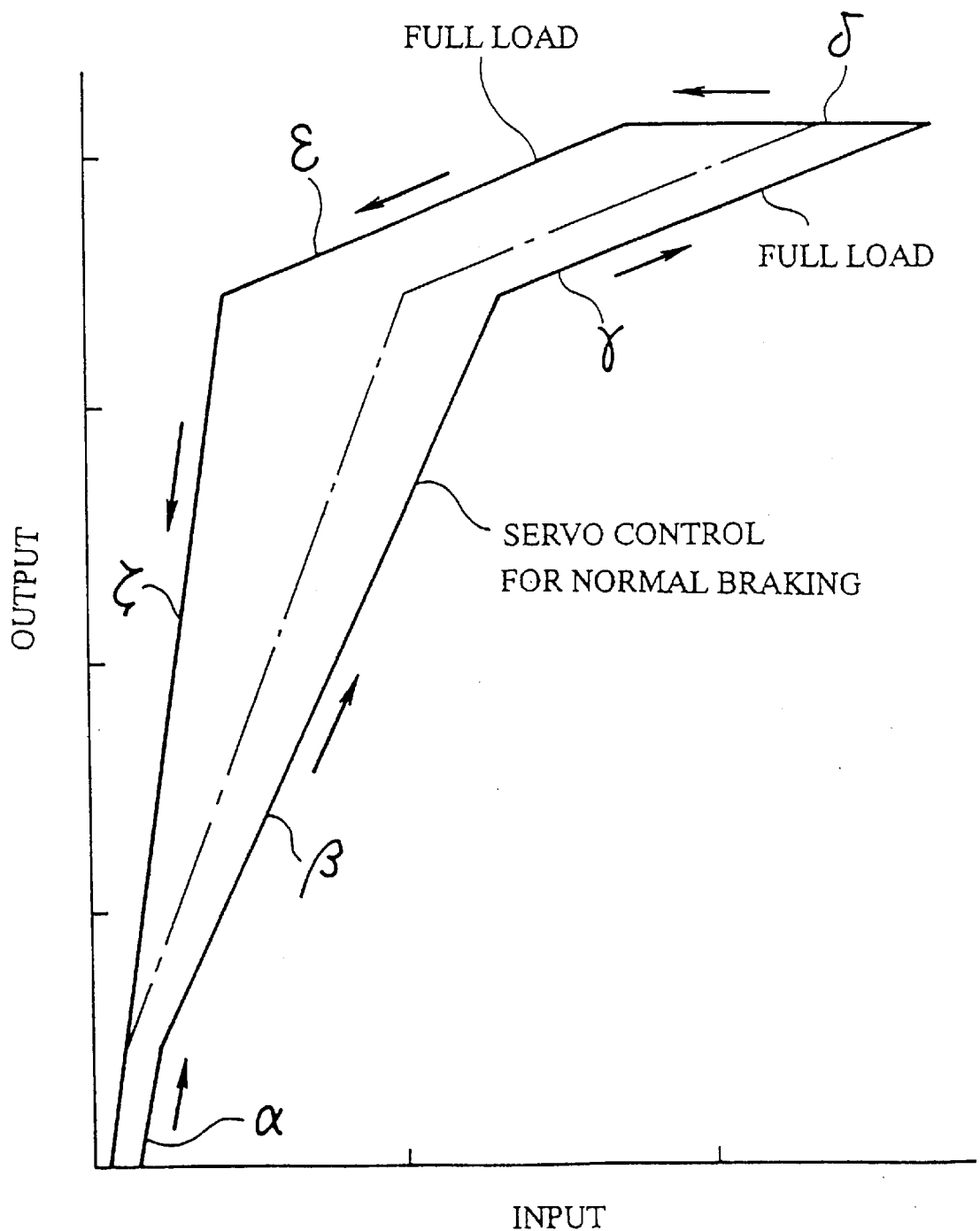
FIG. 16 is a view showing input and output characteristics of the hydraulic boosting device shown in FIG. 15.

In the brake system 1 of the ninth embodiment as set above, the hydraulic boosting device 77 has input-output characteristics as shown in FIG. 16.

In FIG. 16, since the rear end 91*c* of the reaction piston 91 does not come in contact with the step 36*a* of the input shaft 36 yet immediately after the starting of the braking operation, the servo ratio is relatively high and the output is increased along a line a with large inclination according to the rise of the input. That is, jumping action is performed. As the fluid pressure in the power chamber 96 is increased to reach a value overcoming the spring force of the spring 92, the reaction piston 91 retreats relative to the input shaft 36 so that the rear end 91*c* of the reaction piston 91 comes in contact with the step 36*a* of the input shaft 36. Therefore, the jumping action is terminated, the servo control at a relatively low servo ratio for normal braking is performed so that the output is increased along a line β with relatively small inclination. In the full load state where the fluid pressure in the power chamber 96 is no more increased even with advance of the input shaft 36, the increase in the output becomes equal to the increase in the input from the input shaft 36, that is, the output is increased along a line γ with inclination further smaller than the line β.

In the operation release direction from the full load state, the output is not reduced and is maintained constant along a line δ even when the input shaft 36 retreats and thus the input is reduced until the second flange 91*a* of the reaction piston 91 comes in contact with the step 80*a* of the power piston 80. Once the second flange 91*a* of the reaction piston 91 comes in contact with the step 80*a* of the power piston 80, the power piston 80 retreats. At this point, because of the full load state, the decrease in the output is equal to the decrease in the input, that is, the output is decreased along a line ε. In this state, the valve operating member 89 does not come in contact with the stopper 215 yet so that the second valve seat 89*a* is still in contact with the valve ball 156 (i.e. the space A is 0) and the rear end 91*c* of the reaction piston 91 is separated from the step 36*a* of the input shaft 36.

After the valve ball 156 sits in the first valve seat 82*a* and the valve operating member 89 comes in contact with the stopper 215, the second valve seat 89*a* is separated from the valve ball 156 so that the fluid pressure in the power chamber 96 is discharged to the reservoir 102. Therefore, the output is decreased accompanied with the decrease in the input by the servo control. The servo ratio at this point is a relatively large servo ratio equal to the servo ratio of the jumping characteristics because the rear end 91*c* of the reaction piston 91 is already separated from the step 36*a* of the input shaft 36. Therefore, the output is decreased along a line ζ. In this manner, the hydraulic boosting device 77 of the eleventh embodiment has large hysteresis that the input-output characteristics are different between the operative direction and the operation release direction.

As described above, in the brake system 1 of the ninth embodiment, since the hydraulic boosting device 77 has large hysteresis, the brake system 1 can obtain various outputs even with the same input. That is, different input can be provided in order to obtain the same output. Further, in the brake system 1 of the eleventh embodiment, the power chamber 96 of the hydraulic boosting device 77 is connected to the pump 188 through the passage 97, a control pressure inlet 98, and a normally closed solenoid shut-off valve 207, and a solenoid switching valve 218 is provided for switching the communication between the wheel cylinders 7, 8 and the outlet 130 of the master cylinder 6 or the control pressure inlet 98 of the hydraulic boosting device 77. Normally, the solenoid switching valve 218 connects the wheel cylinders 7, 8 to the outlet 130 of the master cylinder 6.

When a predetermined condition is satisfied by vehicle condition such as load, brake operating condition, road surface condition, and/or a driver in the same manner as the seventh embodiment, the pump 188 is driven, the solenoid shut-off valve 207 is opened, and the solenoid switching valve 218 is actuated, thereby connecting the wheel cylinders 7, 8 to the outlet 98 of the hydraulic boosting device 77. Therefore, the pressure produced by the pump is supplied to the power chamber 96 of the hydraulic boosting device 77 to increase the fluid pressure of the power chamber 96 whereby the master cylinder pressure is also increased. At this point, since the diameter of the power piston 80 and the diameter of the primary piston 117 of the master cylinder 6 are equal to each other, the fluid pressure in the power chamber and the master cylinder pressure become equal to each other. Because of the large hysteresis of the input-output characteristics of the hydraulic boosting device 77, the pressure in the power chamber is balanced with the same input within the range of the hysteresis even when the pressure in the power chamber is increased. In addition, the fluid pressure in the power chamber 96 in which the pump pressure is supplied is supplied to the wheel cylinders 7, 8 via the solenoid switching valve 218 so that the braking action is obtained. At this point, since the fluid pressure of the master cylinder 6 is not supplied to the wheel cylinders 7, 8, the pedal stroke is reduced. In this way, the pedal stroke can be changed by controlling the pump 188, the solenoid shut-off valve 207, and the solenoid switching valve 218 under the predetermined conditions as mentioned above.

Figure 17:
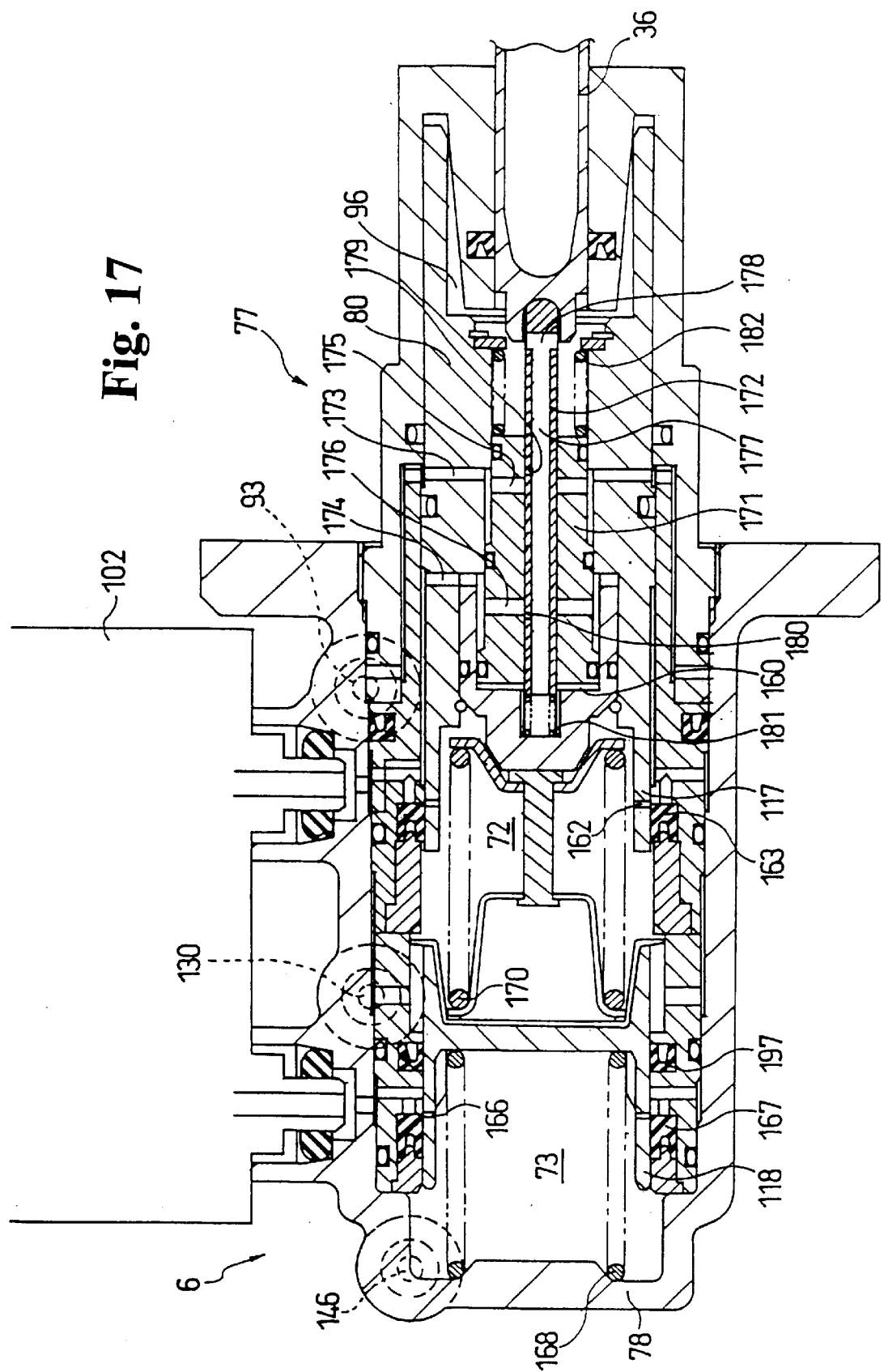
FIG. 17 is a sectional view showing a tenth embodiment of the present invention.

FIG. 17 is a sectional view showing the tenth embodiment of the present invention.

In the brake system 1 of the tenth embodiment, the control valve 155 is composed of a spool valve. Sealingly and slidably fitted in a stepped axial hole of the power piston 80 is a stepped sleeve 171 having a large-diameter front end and a small-diameter rear end. The sleeve 171 has a central axial hole in which a valve spool 172 is slidably disposed. The valve spool 172 is connected to the input shaft 36. The power piston 80 is provided with a fluid supply hole 173 formed therein, which always communicates with the input port 93 connected to the accumulator 109, and a fluid discharge hole 174, which always communicates with the reservoir 102. The sleeve 171 is provided with a fluid supply hole 175 and a fluid discharge hole 176 formed therein, which always communicate with the holes 173 and 174, respectively.

The valve spool 172 is provided therein with an axial hole 177 opening toward the front end and a radial hole 178 communicating with the axial hole 177 and the power chamber 96. The valve spool 172 is also provided therein with a radial supply hole 179 and a radial discharge hole 180 allowing the communication between the axial hole 177 and spaces around the outer surface of the valve spool 172. The valve spool 172 is always biased rearwardly (in the inoperative direction) by a spring 181. The radial supply hole 179 is shut off from the fluid supply hole 175 when the brake system is inoperative as illustrated and is connected to the fluid supply hole 175 by the advance of the valve spool 172 when the brake system is operative. The radial discharge hole 180 is connected to the fluid discharge hole 176 when the brake system is inoperative as illustrated and is shut off from the fluid discharge hole 176 by the advance of the valve spool 172 when the brake system is operative.

A fluid pressure chamber 160 is defined between the large-diameter front end of the sleeve 171 and the power piston 80 and always communicates with the power chamber 96 through the axial hole 177 and the radial hole 178 of the spool 172. The small-diameter rear end of the sleeve 171 always communicates with the power chamber 96. Therefore, the fluid pressure in the fluid pressure chamber 160 acts on the front end of the sleeve 171 and the fluid pressure in the power chamber 96 acts on the rear end of the sleeve 171. The sleeve 171 is always biased froward by a spring 182.

Though the reaction piston 91 is omitted in the brake system 1 of the tenth embodiment, the other structure of the brake system 1 of the tenth embodiment is substantially the same as that of the eighth embodiment.

In the brake system 1 of the tenth embodiment as structured above, as the normal braking operation is started, the valve spool 172 advances so that the radial discharge hole 180 is shut off from the fluid discharge hole 176 and the radial supply hole 179 is connected to the fluid supply hole 175. Then, the pressurized fluid is introduced into the power chamber 96 so as to operate the power piston 80. At this point, the pressurized fluid is also introduced into the fluid pressure chamber 160. Therefore, the fluid pressure equal to that of the power chamber 96 acts on the front end of the sleeve 171 and the fluid pressure of the power chamber 96 acts on the rear end of the sleeve 171. Because of a difference between the pressure receiving areas of the front end and the rear end, however, a differential force is produced by fluid pressure action so that the sleeve 171 is biased rearwardly relative to the power piston 80, in the same manner as the eighth embodiment mentioned above, to a position where the biasing force and the spring force of the spring 182 are balanced. Therefore, the stroke can be changed.

In the tenth embodiment in the same manner as the eighth embodiment, the power piston 80 of the hydraulic boosting device 77 i.e. the output shaft 40 and the control valve members 171, 172 i.e. the input shaft 36 are structured to move relative to each other and the relative position between the power piston 80 and the sleeve 171 of the control valve is controlled by fluid. In the tenth embodiment, by utilizing fluid pressure in the power chamber 96 as the fluid, as the leg power is increased, the stroke of the control valve i.e. the input shaft 36 can be shortened relative to the stroke of the power piston 80.

Also in the tenth embodiment, in the same manner as that of the eighth embodiment shown in FIG. 14, the fluid pressure chamber 160 may be shut off from the power chamber 96 and the pump pressure is supplied to the fluid pressure chamber 160 by controlling the solenoid switching valve 218. In this manner, as well as the aforementioned embodiments, the pedal stroke can be changed according to various conditions at any time or whenever necessary.

The other action and effects of the brake system 1 of the tenth embodiment are the same as those of the eighth embodiment.

Figure 18:
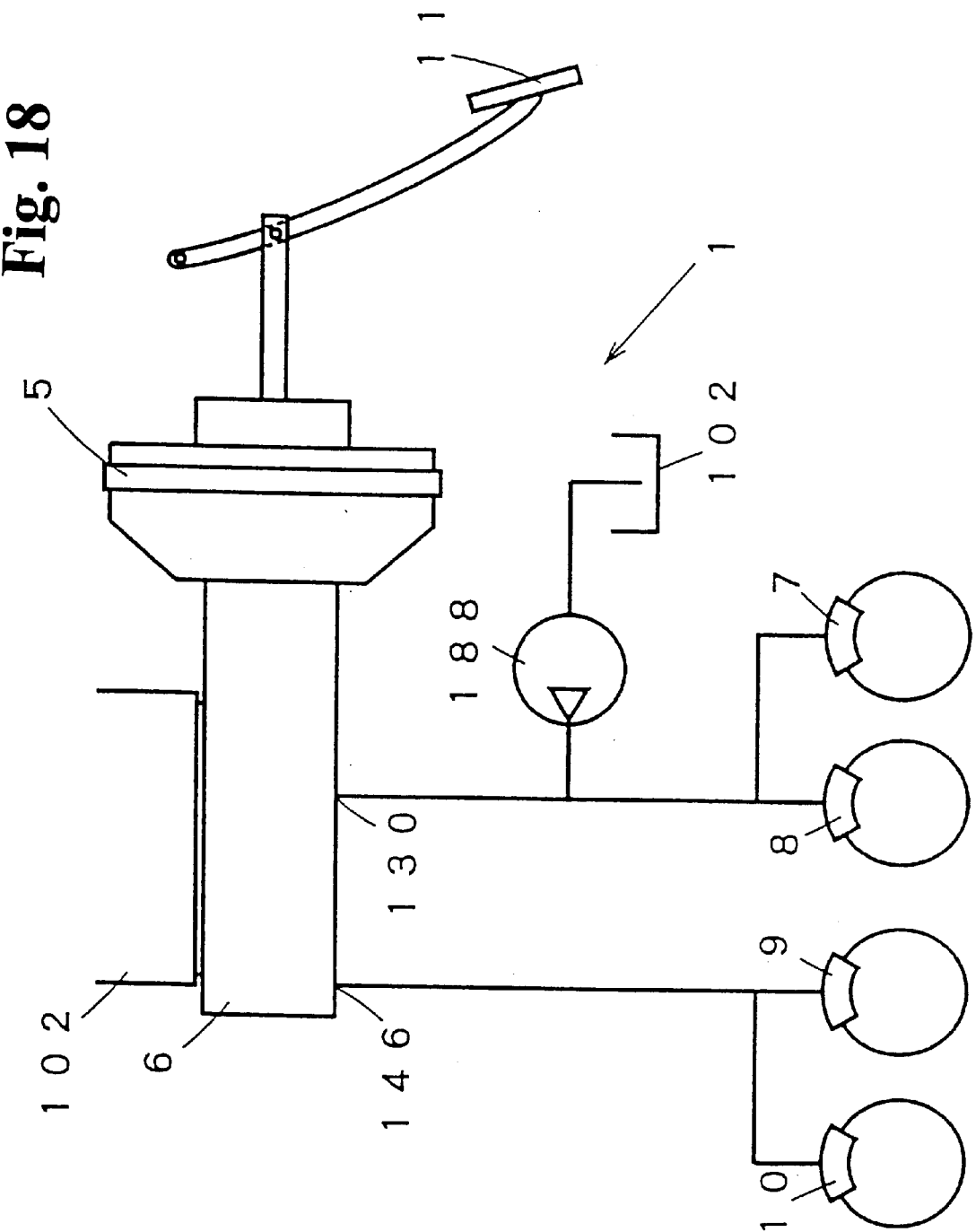
FIG. 18 is a view schematically showing an eleventh embodiment of the present invention.
Figure 19:
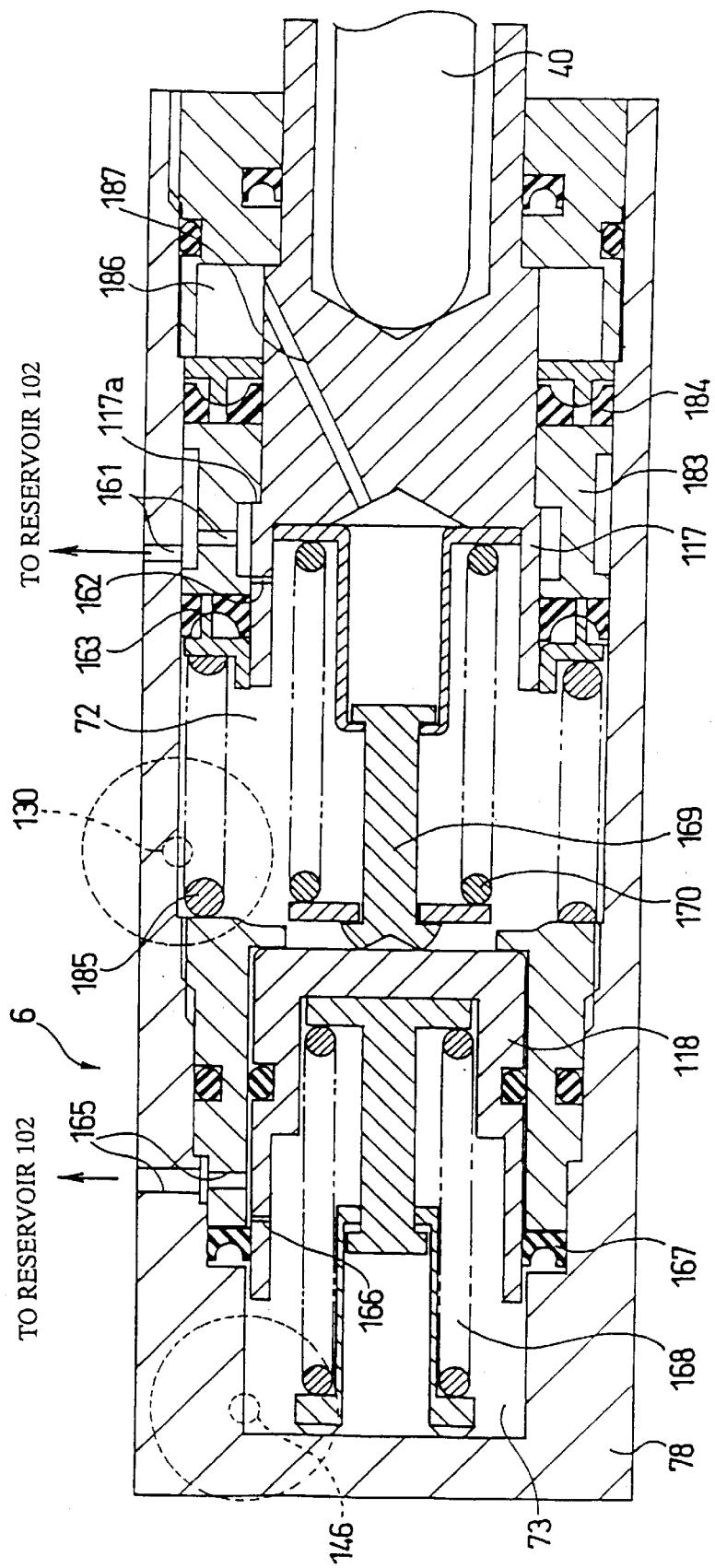
FIG. 19 is a sectional view of the master cylinder employed in a brake system of the eleventh embodiment shown in FIG. 18.

FIG. 18 is a view schematically showing the eleventh embodiment of the present invention, and FIG. 19 is a sectional view of a master cylinder 6 employed in the brake system 1 of the eleventh embodiment.

Though the fluid variable stroke means 3 is provided in a vacuum or hydraulic boosting device in any one of the aforementioned embodiments, the fluid variable stroke means 3 is provided in the master cylinder 6 in the brake system 1 of the eleventh embodiment.

As shown in FIG. 19, the master cylinder 6 of the brake system 1 of the eleventh embodiment is different from the master cylinder 6 of the eighth embodiment shown in FIG. 12 and FIG. 13, in that the cup sealing member 163 of the primary piston 117 is slidably disposed. A stepped sleeve 183 is slidably disposed in the axial hole of the housing 78. The rear end of the stepped sleeve 183 has larger pressure receiving area than that of the front end thereof. Cup sealing members 163, 184 are fitted on the front and rear ends of the stepped sleeve 183. The stepped sleeve 183 is always biased rearwardly by a spring 185. The stepped sleeve 183 is provided therein with a passage 161 always communicating with the reservoir 102. The primary piston 117 sealingly and slidably penetrates the stepped sleeve 183 and the stepped sleeve 183 can be engaged with the step 117a of the primary piston 117 in the forward direction.

A ring-like fluid pressure chamber 186 is defined behind the stepped sleeve 183 and always communicates with the primary chamber 72 through a passage 187 formed in the primary piston 117.

The other structure of the master cylinder of the eleventh embodiment is substantially the same as that of the master cylinder of the eighth embodiment.

As shown in FIG. 18, discharge pressure is introduced to a line connecting the primary chamber 72 and the wheel cylinders 7, 8 by a pump 188.

In the brake system 1 of the eleventh embodiment as structured above, as the brake pedal 11 is pedaled to perform the normal braking operation, the vacuum boosting device 5 is actuated and the output shaft 40 advances in the same manner as described above. Accordingly, the primary piston 117 advances so that the radial hole 162 passes over the cup sealing member 163, thereby developing master cylinder pressure in the primary chamber 72. Because of the master cylinder pressure in the primary chamber 72, the secondary piston 118 also advances so that the radial hole 166 passes over the cup sealing member 167, thereby developing master cylinder pressure in the secondary chamber 73. These master cylinder pressures are introduced into the wheel cylinders 7, 8, 9, 10 whereby the braking action is obtained.

At the starting of braking operation, the pump 188 is actuated so that discharge pressure of the pump 188 is introduced into the primary chamber 72 so that the fluid pressure in the primary chamber 72 is increased. Then, the primary piston 117 retreats relative to the stepped sleeve, so the radial hole 162 is connected to the reservoir 102 again. Therefore, the pressurized fluid in the primary chamber 72 is discharged, so the force produced by the fluid pressure in the primary chamber 72 pushing the primary piston 117 and the input from the output shaft 40 are balanced. The fluid pressure of the primary chamber 72 is introduced into the fluid pressure chamber 186 positioned behind the stepped sleeve through the passage 187 formed in the primary piston 117 and acts on the rear end of the stepped sleeve. The fluid pressure of the primary chamber 72 also acts on the front end of the stepped sleeve 183. Since the pressure receiving area of the rear end of the stepped sleeve 183 is larger than the pressure receiving area of the front end thereof, however, the stepped sleeve 183 is biased forward and is held in a state being in contact with the step 117a of the primary piston 117.

As the primary piston 117 further advances at this state, the stepped sleeve 183 integrally advances. The stepped sleeve 183 stops at a position in the middle load state where the biasing force produced by the pressures based on the difference of the pressure receiving areas and the spring force of the spring 185 are balanced. This position is a stroke position of the stepped sleeve 183 and the stroke of the primary piston 117 is defined by this position. That is, the pump pressure to be supplied is adjusted by the primary piston 117 and the stepped sleeve 183 of the master cylinder 6 according to the input. The adjusted pump pressure is supplied to the wheel cylinders 7, 8, thereby performing braking action. Since the primary piston 117 of the master cylinder 6 is determined by the spring 185 at this point independently of the wheel cylinders 7, 8, the pedal stroke is shortened.

In the fluid variable stroke means 3 of the eleventh embodiment, the stroke of the primary piston 117 of the master cylinder 6 is changed according to the fluid pressure acting on the primary piston 117. According to the eleventh embodiment, as the leg power on the brake pedal is increased, the pedal stroke can be shortened.

Through the pump 188 is actuated at the same time of the braking operation in the eleventh embodiment, the pump 188 may be actuated according to various conditions in the same manner as the seventh embodiment. Accordingly, the pedal stroke can be changed to a desirable distance at any time or whenever necessary.

Though, in the eleventh embodiment, the master cylinder 6 is actuated by the vacuum boosting device 5, the master cylinder 6 may be actuated by the hydraulic boosting device 77 or by any boosting device of other power such as compressed air. The primary piston 117 may be directly actuated by the brake pedal without any boosting device.

Figure 20:
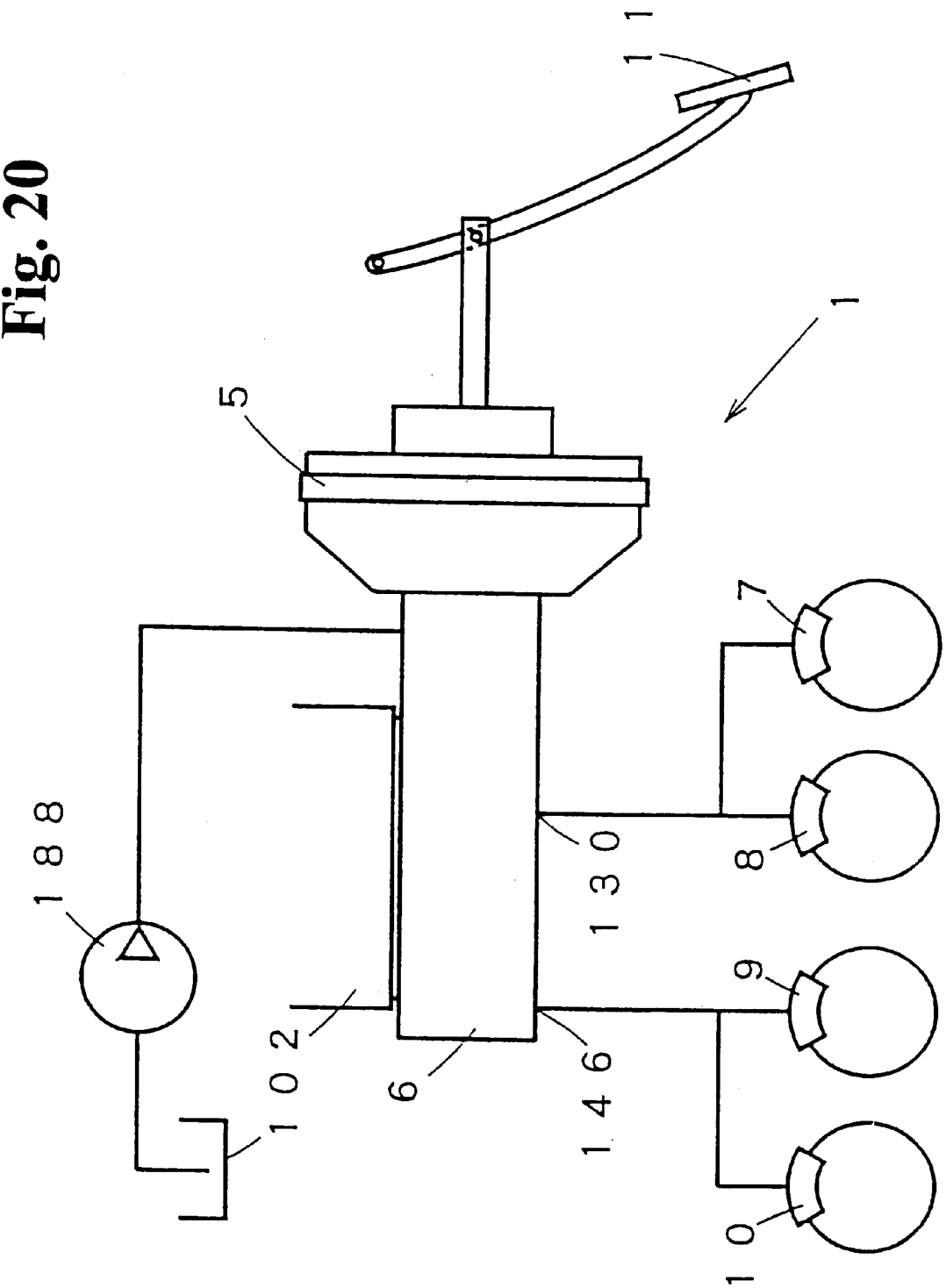
FIG. 20 is a view schematically showing a twelfth embodiment of the present invention.
Figure 21:
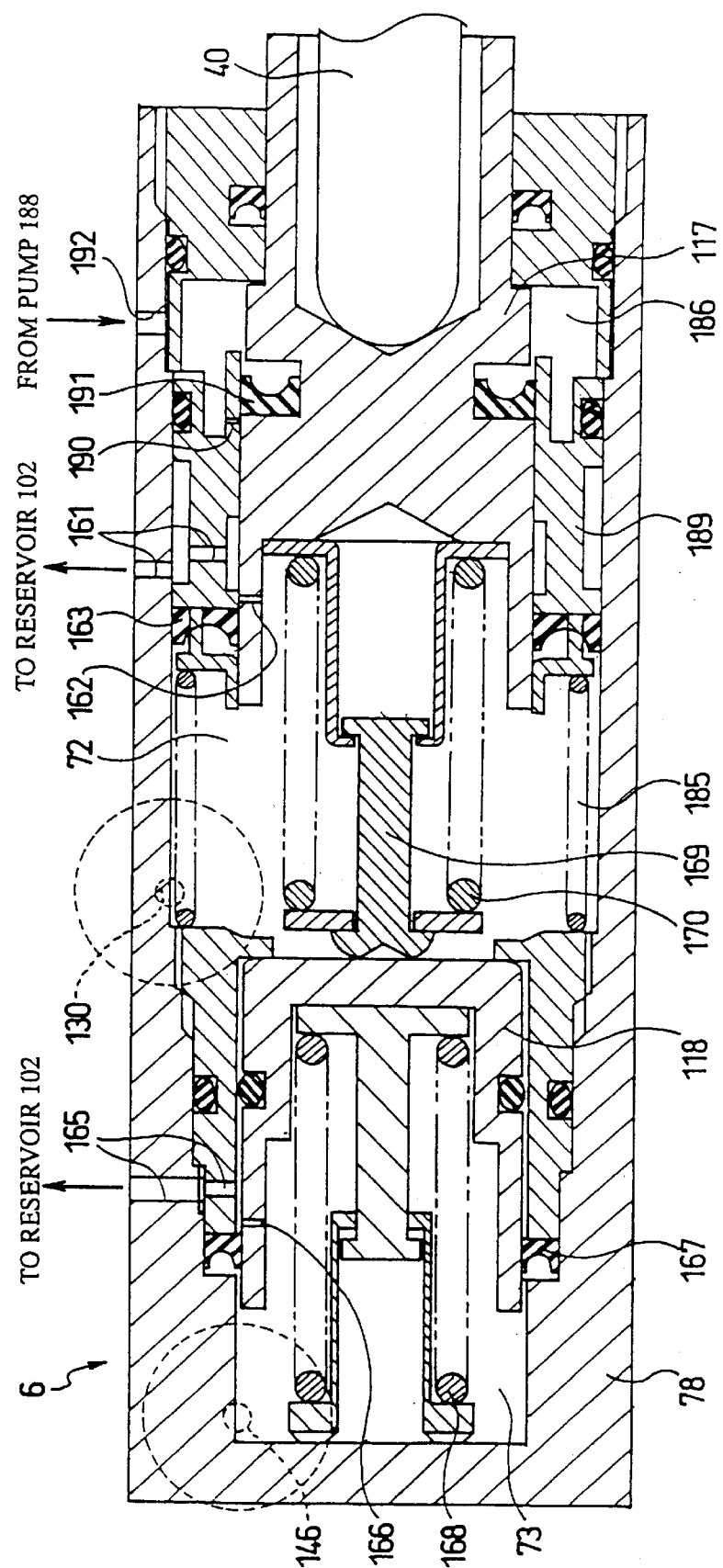
FIG. 21 is a sectional view of a master cylinder employed in the brake system of the twelfth embodiment of the present invention.

FIG. 20 is a view schematically showing the fourteenth embodiment of the present invention and FIG. 21 is a sectional view of a master cylinder 6 employed in the brake system 1 of the twelfth embodiment. Though the stepped sleeve 183 is employed in the aforementioned eleventh embodiment, a sleeve 189 of which the front and rear ends have the same diameter is employed in the fourteenth embodiment instead of the stepped sleeve 183. The sleeve 189 has a radial hole 190 formed in a rear end portion thereof and the primary piston 117 is provided with a cup sealing member 191 cooperating the radial hole 190. In the inoperative state shown in FIG. 21, the cup sealing member 191 is positioned behind the radial hole 190 so that the fluid pressure chamber 186 communicates with the reservoir 102 through the radial hole 190, a space between the inner surface of the sleeve 189 and the outer surface of the primary piston 117, and the passage 161 of the sleeve 189. As the primary piston 117 moves forward relative to the sleeve 189 and the cup sealing member 191 passes over the radial hole 190, the fluid pressure chamber 186 is shut off from the reservoir 102.

The fluid pressure chamber 186 is also connected to the pump 188 through a hole 192 formed in the housing 78. The communication between the primary chamber 72 and the fluid pressure chamber 186 is interlocked by the advance of the primary piston 117.

The other structure of the brake system 1 of the twelfth embodiment is the same as that of the eleventh embodiment.

In the brake system 1 of the twelfth embodiment as structured above, as the brake pedal 11 is pedaled to perform the normal braking operation, the vacuum boosting device 5 is actuated and the output shaft 40 advances in the same manner as described above. Accordingly, the primary piston 117 advances so that the radial hole 162 passes over the cup sealing member 163, thereby developing master cylinder pressure in the primary chamber 72. Because of the master cylinder pressure in the primary chamber 72, the secondary piston 118 also advances so that the radial hole 166 passes over the cup sealing member 167, thereby developing master cylinder pressure in the secondary chamber 73. These master cylinder pressures are introduced into the wheel cylinders 7, 8, 9, 10 whereby the braking action is obtained.

According to the advance of the primary piston 117, the cup sealing member 191 passes over the radial hole 190 so that the fluid pressure chamber 186 is shut off from the reservoir 102.

At the starting of braking operation, the pump 188 is actuated so that discharge pressure of the pump 188 is introduced into the primary chamber 186 through the hole 192 so that the fluid pressure in the fluid pressure chamber 186 becomes higher than the fluid pressure of the primary chamber 72. The sleeve 189 is biased forward by the pressure difference between the fluid pressure of the fluid pressure chamber 186 and the fluid pressure of the primary chamber 72. As the biasing force of the sleeve 189 by the pressure difference overcomes the spring force of the spring 185, the sleeve 189 moves forward and the radial hole 190 passes over the cup sealing member 191, thereby allowing again the communication between the fluid pressure chamber 186 and the reservoir 102. As a result of this, the primary piston 117 further advances. The cup sealing 191 then passes over the radial hole 190 again so that the fluid pressure chamber 186 is shut off from the reservoir 102 again. Therefore, the fluid pressure in the fluid pressure chamber 186 is increased and the sleeve 189 thus advances. In this manner, the sleeve 189 advances with the primary piston 117 with being balanced.

When the pump 188 is inoperative, the amount of fluid supplied from the master cylinder 6 to the wheel cylinders 7, 8 is determined by the stroke of the primary piston 117. When the pump 188 is operative, the amount of fluid supplied to the wheel cylinders 7, 8 is determined by the strokes of the primary piston 117 and the sleeve 189. The stroke of the primary piston 117 is shortened for the amount of fluid supplied to the wheel cylinders 7, 8 by the stroke of the sleeve 189 when the pump is operative.

In the fluid variable stroke means 3 of the twelfth embodiment, the amount of discharge fluid relative to the stroke of the primary piston 117 of the master cylinder 6 i.e. the input shaft 36 is controlled by the fluid. Also according to the twelfth embodiment just like the eleventh embodiment, as the leg power on the brake pedal is increased, the stroke of the master cylinder i.e. the pedal stroke can be shortened. Further, the pump 188 may be actuated according to various conditions in the same manner as the ninth embodiment.

Figure 22:
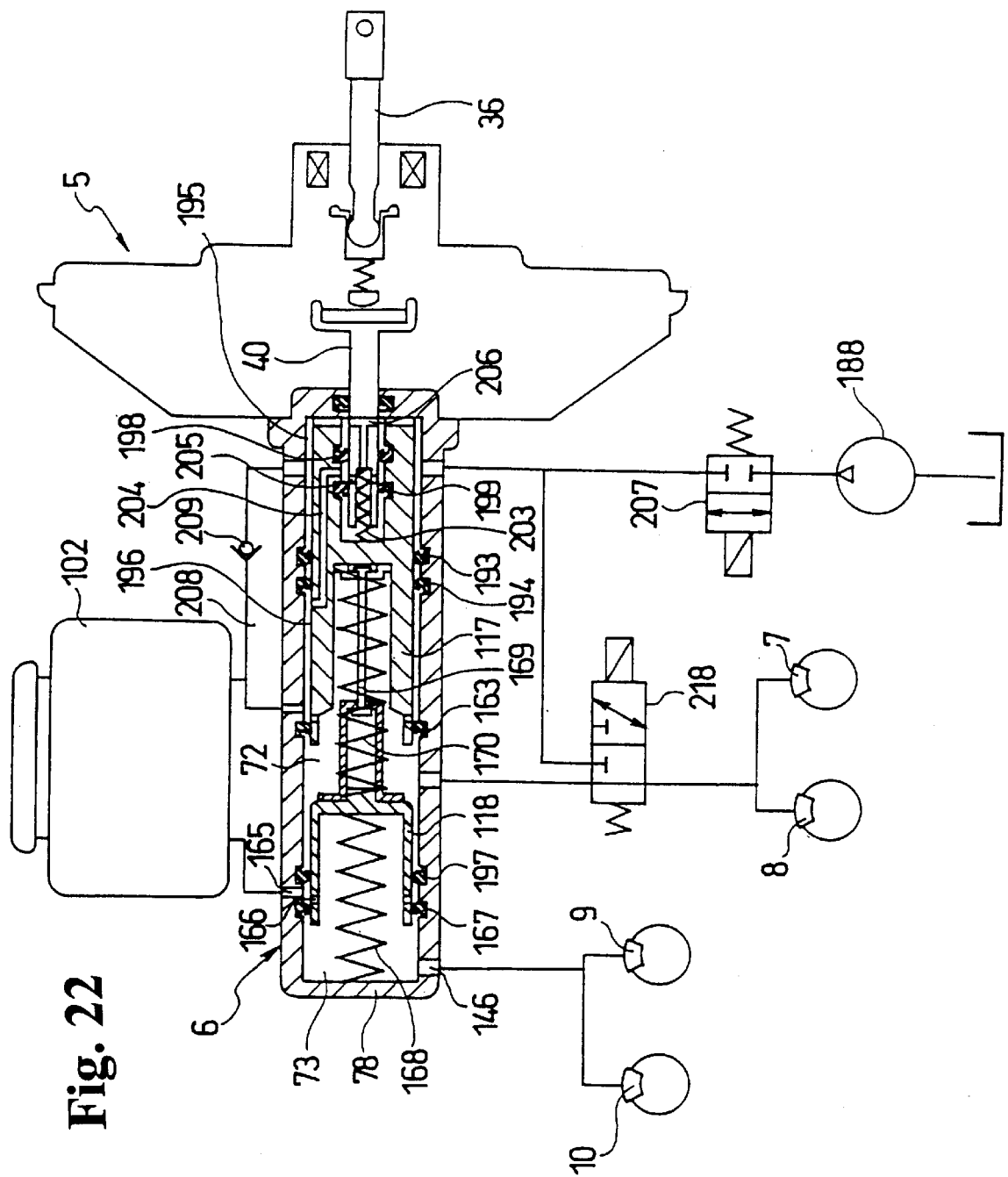
FIG. 22 is a sectional view showing a thirteenth embodiment of the present invention.
Figure 23:
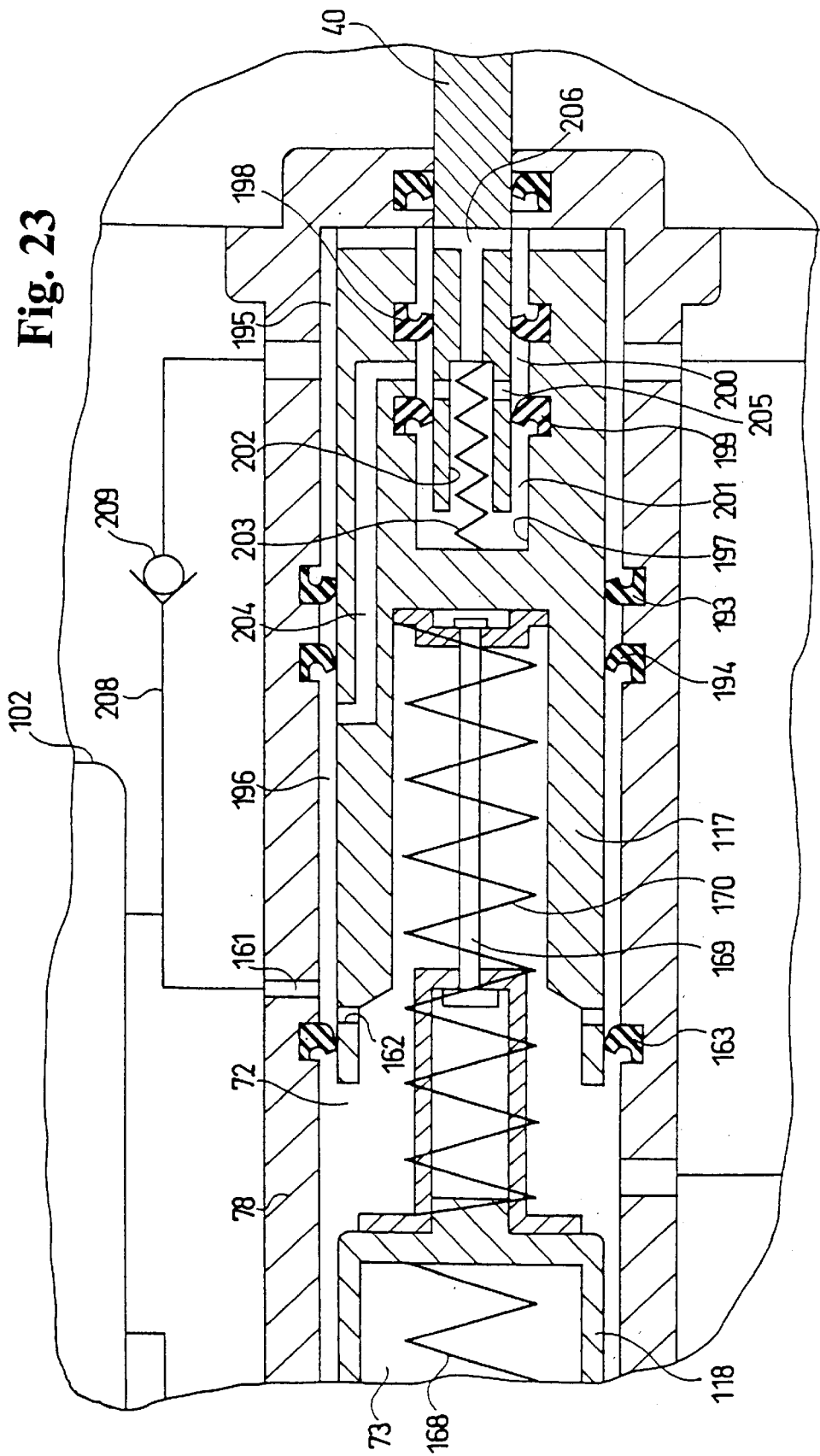
FIG. 23 is a partially enlarged sectional view of the master cylinder shown in FIG. 22.

FIG. 22 is a sectional view showing the thirteenth embodiment of the present invention and FIG. 23 is a partially enlarged sectional view of FIG. 22.

As shown in FIG. 22 and FIG. 23, in the brake system 1 of the thirteenth embodiment, the primary piston 117 slidably penetrates three cup sealing members 193, 194, 163 which are disposed within the axial hole of the housing 78 of the master cylinder 6.

Within the axial hole of the housing 78, a pressure intensifying chamber 195 is formed by the cup sealing member 193 and a first annular fluid chamber 196 is formed between the cup sealing members 194, 163.

The cup sealing member 193 is disposed to block the flow of brake fluid from the pressure intensifying chamber 195 toward the opposite side about the cup sealing member 193 and allow the flow of brake fluid in the reverse direction. The cup sealing member 194 is disposed to block the flow of brake fluid from the first annular fluid chamber 196 to the opposite side about the cup sealing member 194 and allow the flow of brake fluid in the reverse direction. Further, the cup sealing member 163 is disposed to block the flow of brake fluid from the primary chamber 72 toward the first annular fluid chamber 196 and allow the flow of brake fluid in the reverse direction.

As shown in FIG. 23, the primary piston 117 has an axial hole 197 which is formed in a rear end portion of the primary piston 117 to open toward the pressure intensifying chamber 195. A front end portion of the output shaft 40 of the vacuum boosting device 5 is disposed in the axial hole 197 of the primary piston 117. The output shaft 40 slidably penetrates cup sealing members 198, 199 disposed around the inner surface of the axial hole 197.

Within the axial hole 197 of the primary piston 117, a third annular fluid chamber 200 is formed between the cup sealing members 198 and 199 and a reaction chamber 201 is formed by the cup sealing member 199.

The cup sealing member 198 is disposed to block the flow of brake fluid from the pressure intensifying chamber 195 toward the third annular fluid chamber 200 and allow the flow of brake fluid in the reverse direction. The cup sealing member 199 is disposed to block the flow of brake fluid from the reaction chamber 201 toward the third annular fluid chamber 200 and allow the flow of brake fluid in the reverse direction.

The output shaft 40 is provided with an axial hole 202 which is formed in a front end portion of the output shaft 40 to open toward the reaction chamber 201. Compressed and disposed between the output shaft 40 and the primary piston 117 is a return spring 203 of which spring constant is smaller than that of the return spring 170. When the output shaft 40 is in the illustrated inoperative position, the primary piston 117 and the output shaft 40 are separated from each other by the spring force of the return spring 203. As the output shaft 40 advances, the return spring 203 is compressed so that the primary piston 117 and the output shaft 40 are in contact with each other. The primary piston 117 has a passage 204 formed therein, which always allow the communication between the first annular fluid chamber 196 and the third annular fluid chamber 200.

The output shaft 40 has a radial hole 205 formed in the front end portion thereof, which allows the communication between the third annular fluid chamber 200 and the reaction chamber 201. When the output shaft 40 is in the illustrated inoperative position, the radial hole 205 is positioned slightly behind the cup sealing member 199 to allow the communication between the third annular fluid chamber 200 and the reaction chamber 201. As the output shaft 40 is actuated, the radial hole 205 passes over the cup sealing member 199 so as not to allow the communication between the third annular fluid chamber 200 and the reaction chamber 201. The output shaft 40 has a passage 206 formed therein which always allows the communication between the pressure intensifying chamber 195 and the reaction chamber 201.

The pressure intensifying chamber 195 of the master cylinder 6 is connected to the pump 188 through a normally-closed solenoid shut-off valve 207. Disposed on a line 208 connecting the pressure intensifying chamber 195 and the reservoir 102 is a check valve 209 only allowing the flow of brake fluid from the reservoir 102 toward the pressure intensifying chamber 195. Disposed on a line between the primary chamber 72 of the master cylinder 6 and the wheel cylinders 7, 8 is a solenoid switching valve 218 which normally allows the communication between the primary chamber 72 and the wheel cylinders 7, 8 and, in its operative state, allows the communication between the pump 188 and the wheel cylinders 7, 8.

In the brake system of the thirteenth embodiment as structured above, all components are in the inoperative positions as illustrated when the brake system is inoperative. In this state, the pressure intensifying chamber 195 of the master cylinder 6 communicates with the reservoir 102 through the passage 206 and the radial hole 205 of the output shaft 40, the third annular fluid chamber 200, the passage 204, and the first annular fluid chamber 196 and thus become at the atmospheric pressure.

As the brake pedal 11 is pedaled at this state to perform the normal braking operation, the vacuum boosting device 5 is actuated and the output shaft 40 advances and comes in contact with the primary piston 117 to transmit output of boosted power relative to the leg power on the brake pedal to the primary piston 117. By the advance of the output shaft 40, the radial hole 205 passes over the cup sealing member 199 so that the reaction chamber 201 and the pressure intensifying chamber 195 are shut off from the reservoir 102.

By the output of the vacuum boosting device 5, the primary piston 117 advances to develop master cylinder pressure in the primary chamber 72. By the master cylinder pressure, the secondary piston 118 also advances to develop master cylinder pressure in the secondary chamber 73. These master cylinder pressures are introduced into the wheel cylinders 7, 8, 9, 10 thereby performing the normal braking.

Though the volume of the pressure intensifying chamber 195 is increased by the advance of the primary piston 117 so that the pressure in the pressure intensifying chamber 195 is directed toward negative pressure at this point, brake fluid is introduced from the reservoir 102 to the pressure intensifying chamber 195 through the check valve 209 so that the inside of the pressure intensifying chamber 195 is held at the atmospheric pressure. Therefore, the primary piston 117 is not affected and thus can smoothly advance.

When the brake pedal 11 is released for canceling the braking operation, the vacuum boosting device 5 becomes inoperative and the output shaft 40 retreats in a direction toward the inoperative position. Since the reaction chamber 201 and the pressure intensifying chamber 195 both are shut off from the reservoir 102 so as to be in the sealed state until the radial hole 205 moves behind the cup sealing member 199, neither the primary piston 117 nor the secondary piston 118 retreats but only the output shaft 40 retreats.

As the output shaft 40 further retreats and the radial hole 205 passes over the cup sealing member 199, both the reaction chamber 201 and the pressure intensifying chamber 195 communicate with the reservoir 102 through the same way as that of the inoperative state. Therefore, the brake fluid in both the reaction chamber 201 and the pressure intensifying chamber 195 is discharged and the primary piston 117 retreats. Accordingly, the secondary piston 118 also retreats. The braking pressures of the wheel cylinders 7, 8, 9, 10 are reduced. As the radial holes 162, 166 of the pistons 117, 118 are moved to positions behind the cup sealing member 163, 167, respectively, the primary chamber 72 and the secondary chamber 73 both are allowed to communicate with the reservoir 102 to be at the atmospheric pressure. Finally, the brake system becomes in the inoperative state as illustrated, thereby canceling the braking action.

For example, when the brake pedal 11 is pedaled with a rate of rise of the leg power or pedal stroke of the brake pedal which is higher than that for normal braking, the electronic control unit detects the high rate rise according to a detected signal from a suitable detection sensor (not shown) and determines that the brake assist control such as for emergency braking is required. In this case, the electronic control unit actuates the pump 188 and opens the solenoid shut-off valve 207. The pump 188 sends the brake fluid in the reservoir 102 to the pressure intensifying chamber 195 through the solenoid shut-off valve 207. At this point, the output shaft 40 already advanced to a position where the pressure intensifying chamber 195 and the reaction chamber 201 are both shut off from the reservoir 102 and become in the sealed state in the same manner as described above, so the pressure in the pressure intensifying chamber 195 and the pressure in the reaction chamber 201 are increased to the pump discharge pressure.

By the pump discharge pressure in the reaction chamber 201, the output shaft 40 is pushed back and stops at a position where force produced by the fluid pressure in the reaction chamber 201 acting on the output shaft 40 and the output of the output shaft 40 are balanced. Since the pressure receiving area of the primary piston 117 where the pump discharge pressure acts and the pressure receiving area of the primary piston 117 on where the master cylinder pressure acts are equal to each other, the master cylinder pressure and the pump discharge pressure become equal to each other.

The solenoid switching valve 218 is also actuated at the same time when the solenoid shut-off valve 207 is opened, thereby allowing the communication between the wheel cylinders 7, 8 and the pump 188. Therefore, the primary piston 117 does not move so that pressure by the pump 188 is supplied to the wheel cylinders 7, 8. At this point, the pressure by the pump is higher than the master cylinder pressure when the pump is inoperative by the effect of the pressure intensifying mechanism mentioned above, thereby producing braking forces larger than the case of normal braking and providing a shorter pedal stroke during the brake assist mode.

In the thirteenth embodiment, the fluid variable stroke means employs the pressure intensifying mechanism provided in the master cylinder 6 to supply the intensified fluid pressure to the wheel cylinders. According to the fifteenth embodiment, by controlling the pump 188, the solenoid shut-off valve 207, the solenoid switching valve, the braking force can be intensified and/or the pedal stroke can be changed under various conditions including the aforementioned braking assist mode at any time or whenever necessary.

When the pedaling of the brake pedal 11 is released, the electronic control unit stops the pump 188 and closes the solenoid shut-off valve 207 according to a signal from the detected sensor. Because of the close of the solenoid shut-off valve 207, the pressure intensifying chamber 195 and the reaction chamber 201 become in the sealed state.

In the same manner as the case of canceling the normal braking, the output 40 first retreat and the pressure intensifying chamber 195 and the reaction chamber 201 both are allowed to communicate with the reservoir 102 so that the primary piston 117 and the secondary piston 118 retreat. Therefore, the vacuum boosting device 5 and the master cylinder 6 become in the inoperative state as illustrated, thereby canceling the braking action.

Figure 24:
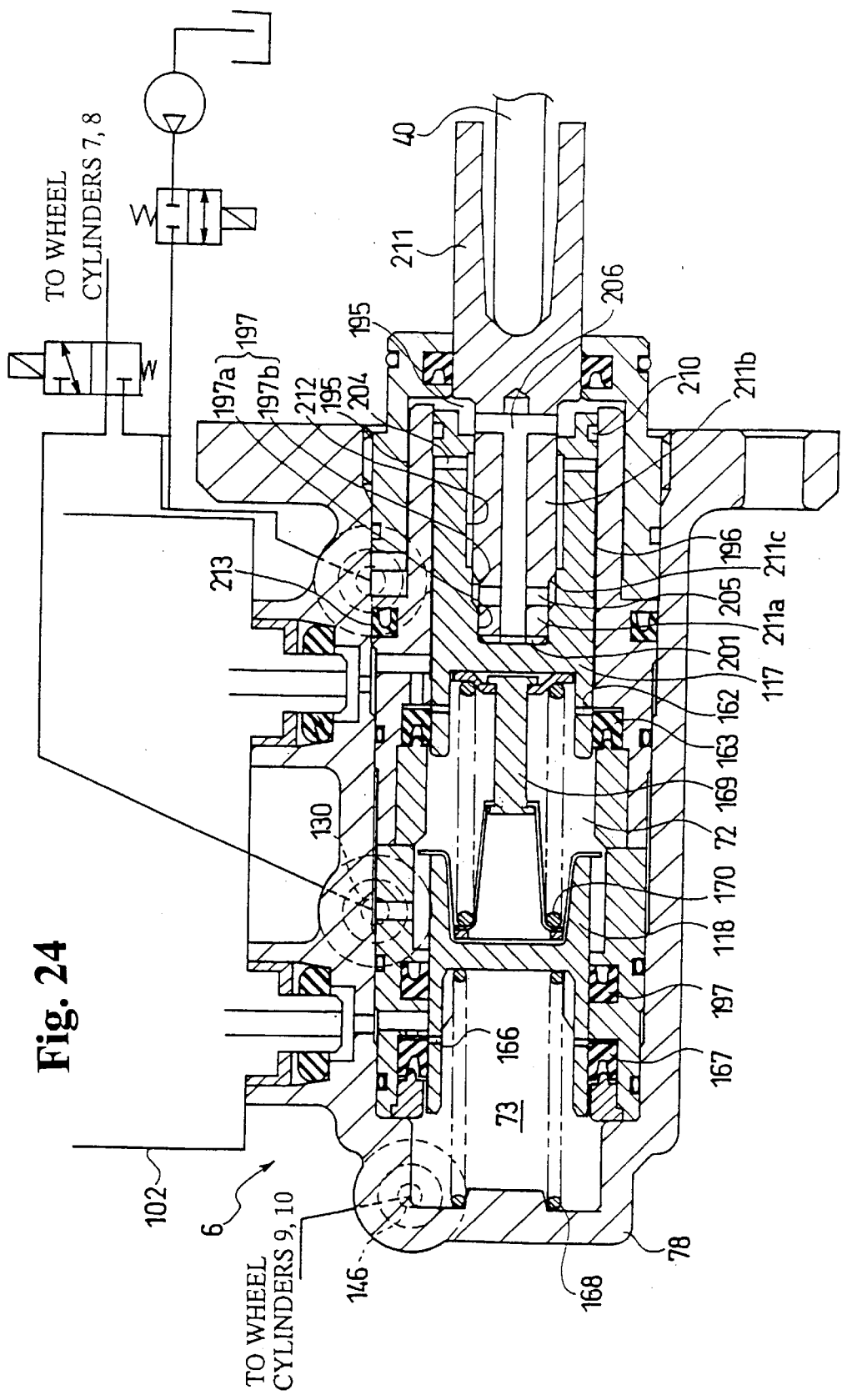
FIG. 24 is a view showing a fourteenth embodiment of the preset invention.

FIG. 24 is a view showing the fourteenth embodiment of the present invention.

As shown in FIG. 24, in the brake system 1 of the fourteenth embodiment, an O-ring 210 is provided around the outer surface of the primary piston 117 instead of the cup sealing member 193 defining the pressure intensifying chamber 195 and the cup sealing member 194 defining the first annular fluid chamber 196 of the thirteenth embodiment.

In the thirteenth embodiment, the output shaft 40 of the vacuum boosting device 5 and an input rod 211 of the master cylinder 6 are separately formed. A front end portion of the input rod 211 is slidably inserted in the axial hole 197 of the primary piston 117. The front end portion of the input rod 211 is formed as a stepped rod having a step 211c formed between a small-diameter portion 211a and a large-diameter portion 211b. On the other hand, the axial hole 197 of the primary piston 117 is formed as a stepped hole having a small-diameter hole 197a and a large-diameter hole 197b. The small-diameter portion 211b of the input rod 211 is slidably inserted in the small-diameter hole 197a of the axial hole 197 and the large-diameter portion 211b is slidably inserted in the large-diameter hole 197b. In the fourteenth embodiment, the cup sealing members 198, 199 of the thirteenth embodiment are omitted, and the seal between the input rod 211 and the axial hole 197 is ensured by the slidable fitting therebetween. The large-diameter hole 197b of the axial hole 197 has an axial groove 212 which is formed in a portion of the inner surface of the large-diameter hole 197b. The axial groove 212 always communicates with the reservoir 102 through the passage 204 and the first annular fluid chamber 196. The primary piston 117 and the input rod 211a re positioned when the brake system is inoperative in such a manner that the end of the input rod 211 is in contact with the primary piston 117. In this state, the step 211c is positioned in a range of the large-diameter hole 197b where the axial groove 212 does not extend. Therefore, the reaction chamber 201 and the pressure intensifying chamber 195 both are shut off from the axial groove 212 i.e. the reservoir 102. When the input rod 211 moves rearward to the primary piston 117, the step 211c is positioned in a range of the large-diameter hole 197b where the axial groove 212 extends. Therefore, the reaction chamber 201 and the pressure intensifying chamber 195 communicate with the axial groove 212 i.e. the reservoir 102. The return spring 203 compressed and disposed between the output shaft 40 and the primary piston 117 in the thirteenth embodiment is omitted in the fourteenth embodiment.

Instead of the check valve 209 of the thirteenth embodiment, a cup sealing member 213 is provided and a line at the pump 188 side is connected to the line 208 at the pressure intensifying chamber 195 by the cup sealing member 213 in the fourteenth embodiment.

The other structure of the brake system 1 of the fourteenth embodiment is the same as that of the thirteenth embodiment.

Since the brake system 1 of the fourteenth embodiment as structured above is in the illustrated state when it is inoperative, the step 211c is positioned in the range of the large-diameter hole 197b where the axial groove 212 does not extend and both the reaction chamber 201 and the pressure intensifying chamber 195 are shut off from the reservoir 102 so as to be in the sealed state.

The normal braking operation is conducted at this state, the vacuum boosting device 5 is actuated so that the output thereof is transmitted to the input rod 211 through the output shaft 40. Then, the input rod 211 and the primary piston 117 advance so that the normal braking action is obtained in two circuits in the same manner as the thirteenth embodiment mentioned above. At this point, the volume of the pressure intensifying chamber 195 is increased. Since the brake fluid in the reservoir 102 passes an outer lip of the cup sealing member 213 and is supplied into the pressure intensifying chamber 195, however, the primary piston 117 smoothly advances.

When the normal braking is cancelled, the reaction chamber 201 and the pressure intensifying chamber 195 are both in the sealed state, so the primary piston 117 does not retreat in the same manner as the thirteenth embodiment but only the input rod 211 retreats. Then, the step 211c is positioned in a range of the large-diameter hole 197b where the axial groove 212 extends so that the reaction chamber 201 and the pressure intensifying chamber 195 both communicate with the reservoir 102 to allow the brake fluid in the reaction chamber 201 and the pressure intensifying chamber 195 to be discharged. Therefore, in the same manner as the thirteenth embodiment, the primary piston 177 retreats discharging the brake fluid in the reaction chamber 201 and the pressure intensifying chamber 195 to the reservoir 102. In this way, the normal braking is cancelled.

Also in the fourteenth embodiment, just like the thirteenth embodiment, the pressure in the pressure intensifying chamber 195 is intensified corresponding to the input by supplying discharge pressure from the pump 188 to the pressure intensifying chamber 195 and braking forces can be intensified and the pedal stroke can be shortened by supplying the pump pressure to the wheel cylinders 7, 8.

The canceling operation of the braking action accompanied with the brake assist control is the same as that of the thirteenth embodiment.

The other action of the brake system of the fourteenth embodiment is also the same as that of the thirteenth embodiment.

FIG. 25 is a view showing the fifteenth embodiment of the present invention.

Though the vacuum boosting device 5 and the master cylinder 6 are employed in combination in the thirteenth embodiment mentioned above, a hydraulic boosting device 77 is employed in the brake system 1 of the fifteenth embodiment as shown in FIG. 25. In the fifteenth embodiment, the sectional area (the pressure receiving area) of the power piston 80 and the sectional area of the primary piston 117 are set to be equal to each other.

Though the output shaft 40 comes in contact with the primary piston 117 only when the output shaft 40 advances relative to the primary piston 117 in the fifteenth embodiment, the output shaft 40 comes in contact with the primary piston 117 either when the output shaft 40 advances and when it retreats relative to the primary piston 117. For this, a flange 40a is provided at the front end of the output shaft 40 and a contact portion 117a, which the flange 40a comes in contact with when the output shaft 40 retreats relative to the primary piston 117, is formed in the primary piston 117. The other structure of the output shaft 40 is the same as that of the output shaft 40 of the thirteenth embodiment and the other structure of the primary piston 117 is the same as that of the primary piston 117 of the thirteenth embodiment. The cup sealing member 194 in the thirteenth embodiment is omitted in the fifteenth embodiment.

The other structure of the brake system 1 of the fifteenth embodiment is the same as that of the thirteenth embodiment. The action of the brake system 1 of the fifteenth embodiment is the same as that of the thirteenth embodiment.

FIG. 27 is a view showing the sixteenth embodiment of the present invention.

The brake system 1 of the sixteenth embodiment employs the hydraulic boosting device 77 and the master cylinder 6 which are the same as those of the eighth embodiment shown in FIG. 12. Both the output port 98 of the fluid boosting device 77 and the connection port 130 communicating with the primary chamber 72 of the master cylinder 6 can be connected to the wheel cylinders 7, 8. The solenoid switching valve 217 normally connects the output port 98 and the connection port 130 to the wheel cylinders 7, 8 so that the power chamber 96 and the primary chamber 72 of the hydraulic boosting device 77 are both connected to the wheel cylinders 7, 8. When play in strokes of the wheel cylinders 7, 8 is cancelled after starting the braking operation, the solenoid switching valve 217 is switched by the electronic control unit to connect only the primary chamber 72 to the wheel cylinders 7, 8.

The other structure of the brake system 1 of the sixteenth embodiment is the same as that of the eighth embodiment.

In the brake system 1 of the sixteenth embodiment as structured above, since the solenoid switching valve 217 is set in the position as illustrated just after starting the braking operation, pressurized fluid introduced into the power chamber 96 of the hydraulic boosting device 77 is directly introduced into the wheel cylinders 7, 8 through the output port 98. Then, play in strokes of the wheel cylinders 7, 8 are rapidly cancelled and, at this point, the solenoid valve 217 is switched. Therefore, the pressurized fluid starts to be supplied from the master cylinder 6 to the wheel cylinders 7, 8. Since the play in strokes of the wheel cylinders 7, 8 are already cancelled at this point, the pedal stroke is shortened. The pedal stroke can be varied by suitably controlling ON/OFF of the solenoid switching valve 217 in the same manner as the aforementioned embodiments.

As apparent from the above description, according to the brake system of the present invention, the stroke of the brake operating means can be variously changed by fluid at any time or whenever necessary. Since the stroke of the brake operating means is changed by fluid, the stroke can be variously set in a simple manner of controlling the fluid by the electronic control unit.

Therefore, the brake operating means can be set variously to have a proper pedal stroke corresponding to vehicle condition such as load, brake operating condition, and/or choice by a driver.

What is claimed is:

1. A brake system comprising:

brake operating means for providing a braking operation;

brake pressure output means connected to the brake operating means for producing a brake fluid pressure according to the braking operation of said brake operating means;

braking force output means connected to the brake pressure output means for producing a braking force according to the brake fluid pressure, and having a pressure boosting device operated-by a fluid pressure, said pressure boosting device including an input member moved according to the braking operation of the brake operating means, a control valve for controlling the fluid pressure operated and controlled by the input member, a valve body provided with said control valve and moving according to a stroke of the input member, a power piston arranged to be relatively movable with the valve body and operated by the fluid pressure controlled by the control valve for output, an output member for outputting the output of the power piston outside, a reaction mechanism having a reaction piston operated by the fluid pressure controlled by the control valve, and a reaction piston urging spring situated between the reaction piston and the valve body and urging the reaction piston in a direction opposite to an operation direction thereof, and traveling range control means located between the power piston and the valve body in the pressure boosting device and having means for urging the power piston in a direction opposite to the valve body, said traveling range control means being connected to the brake operating means for changing a stroke range of said brake operating means by fluid control so that the stroke range of said brake operating means is changed by the traveling range control means.

2. A brake system as claimed in claim 1, wherein said means for urging the power piston is formed of an urging spring.

3. A brake system as claimed in claim 2, wherein said pressure boosting device is one of a vacuum boosting device, a hydraulic boosting device, a compressed air boosting device.

4. A brake system as claimed in claim 1, wherein said fluid is gas or liquid.

5. A brake system as claimed in claim 1, wherein a change of the traveling range of said brake operating means is conducted whenever a predetermined condition is satisfied.

6. A brake system as claimed in claim 5, wherein said predetermined condition is set based on at least one of conditions including vehicle load condition, brake operating condition, road surface condition, and choice by a driver.

* * * * *